US011856295B2

(12) United States Patent
Wang et al.

(10) Patent No.: US 11,856,295 B2
(45) Date of Patent: Dec. 26, 2023

(54) MULTI-CAMERA VIDEO STABILIZATION

(71) Applicant: Google LLC, Mountain View, CA (US)

(72) Inventors: Youyou Wang, Los Altos, CA (US); Fuhao Shi, Sunnyvale, CA (US); Chia-Kai Liang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/515,187

(22) Filed: Oct. 29, 2021

(65) Prior Publication Data

US 2022/0053133 A1    Feb. 17, 2022

Related U.S. Application Data

(63) Continuation of application No. 16/941,775, filed on Jul. 29, 2020, now Pat. No. 11,190,689.

(51) Int. Cl.
*H04N 23/68* (2023.01)
*H04N 23/69* (2023.01)
*H04N 23/90* (2023.01)

(52) U.S. Cl.
CPC ....... *H04N 23/683* (2023.01); *H04N 23/6811* (2023.01); *H04N 23/69* (2023.01); *H04N 23/90* (2023.01)

(58) Field of Classification Search
None
See application file for complete search history.

(56) References Cited

U.S. PATENT DOCUMENTS 4,637,571 A    1/1987  Holder et al.
5,053,876 A   10/1991  Blissett et al.
(Continued)

FOREIGN PATENT DOCUMENTS

CN    101473266    7/2009
CN    103853908    6/2014
(Continued)

OTHER PUBLICATIONS

"Improving Autofocus Speed in Macrophotography Applications", Technical Disclosure Commons—https://www.tdcommons.org/dpubs_series/5133, May 11, 2022, 9 pages.
(Continued)

*Primary Examiner* — James M Hannett
(74) *Attorney, Agent, or Firm* — McDonnell Boehnen Hulbert & Berghoff LLP

(57) ABSTRACT

Methods, systems, and apparatus, including computer programs encoded on computer-storage media, for multi-camera video stabilization. In some implementations, a video capture device has a first camera and a second camera. The video capture device provides a digital zoom capability permitting user-specified magnification changes within a digital zoom range during video recording. The video capture device is configured to use video data from different cameras over different portions of the digital zoom range. The video capture device can process image data captured using the second camera by applying a set of transformations including (i) a first transformation to a canonical reference space for the second camera, (ii) a second transformation to a canonical reference space for the first camera, and (iii) a third transformation to apply electronic image stabilization to image data in the canonical reference space for the first camera.

20 Claims, 9 Drawing Sheets

(56) References Cited

U.S. PATENT DOCUMENTS

| | | |
|---|---|---|
| 7,643,062 B2 | 1/2010 | Silverstein et al. |
| 7,697,725 B2 | 4/2010 | Burns et al. |
| 7,796,872 B2 | 9/2010 | Sachs et al. |
| 8,009,872 B2 | 8/2011 | Kurata |
| 8,009,971 B2 | 8/2011 | Koo et al. |
| 8,379,932 B2 | 2/2013 | Fukunishi |
| 8,493,459 B2 | 7/2013 | Albu |
| 8,553,275 B2 | 10/2013 | Conlon et al. |
| 8,711,233 B2 | 4/2014 | Jefremov et al. |
| 8,736,692 B1 | 5/2014 | Wong et al. |
| 8,743,222 B2 | 6/2014 | Hamalainen |
| 8,913,140 B2 | 12/2014 | Zhou |
| 9,002,068 B2 | 4/2015 | Wang |
| 9,100,575 B2 | 8/2015 | Lee et al. |
| 9,185,291 B1 | 11/2015 | Shabtay et al. |
| 9,232,138 B1 | 1/2016 | Baldwin |
| 9,280,810 B2 | 3/2016 | Stec et al. |
| 9,292,734 B2 | 3/2016 | Zhu et al. |
| 9,392,188 B2 | 7/2016 | Shabtay et al. |
| 9,402,032 B2 | 7/2016 | Dror et al. |
| 9,407,827 B2 | 8/2016 | Cao et al. |
| 9,413,972 B2 | 8/2016 | Shabtay et al. |
| 9,538,152 B2 | 1/2017 | Shabtay et al. |
| 9,568,712 B2 | 2/2017 | Dror et al. |
| 9,571,731 B2 | 2/2017 | Shabtay et al. |
| 9,596,411 B2 | 3/2017 | Thivent et al. |
| 9,599,796 B2 | 3/2017 | Shabtay et al. |
| 9,661,233 B2 | 5/2017 | Shabtay et al. |
| 9,674,439 B1 | 6/2017 | Mihic et al. |
| 9,743,001 B1 | 8/2017 | Stec |
| 9,774,798 B1 | 9/2017 | Evans, V et al. |
| 9,829,684 B2 | 11/2017 | Shabtay et al. |
| 9,857,568 B2 | 1/2018 | Dror et al. |
| 9,876,952 B2 | 1/2018 | Shabtay et al. |
| 9,888,179 B1 | 2/2018 | Liang et al. |
| 9,927,600 B2 | 3/2018 | Goldenberg et al. |
| 9,934,612 B2 | 4/2018 | Meier et al. |
| 9,953,217 B2 | 4/2018 | Feris et al. |
| 9,998,653 B2 | 6/2018 | Shabtay et al. |
| 9,998,659 B2 | 6/2018 | Bassi |
| 10,015,384 B2 | 7/2018 | Bachar et al. |
| 10,015,408 B2 | 7/2018 | Shabtay et al. |
| 10,027,893 B2 | 7/2018 | Bell et al. |
| 10,036,895 B2 | 7/2018 | Avivi et al. |
| 10,070,060 B2 | 9/2018 | Goldenberg et al. |
| 10,084,953 B1 | 9/2018 | Shabtay et al. |
| 10,126,633 B2 | 11/2018 | Avivi et al. |
| 10,156,706 B2 | 12/2018 | Shabtay et al. |
| 10,171,738 B1 | 1/2019 | Liang et al. |
| 10,194,089 B2 * | 1/2019 | Nash .............. H04N 23/698 |
| 10,225,479 B2 | 3/2019 | Shabtay et al. |
| 10,250,797 B2 | 4/2019 | Shabtay et al. |
| 10,230,898 B2 | 5/2019 | Cohen et al. |
| 10,284,780 B2 | 5/2019 | Goldenberg et al. |
| 10,288,840 B2 | 5/2019 | Shabtay et al. |
| 10,288,896 B2 | 5/2019 | Shabtay et al. |
| 10,288,897 B2 | 5/2019 | Bachar et al. |
| 10,317,647 B2 | 6/2019 | Dror et al. |
| 10,324,277 B2 | 6/2019 | Dror et al. |
| 10,326,942 B2 | 6/2019 | Shabtay et al. |
| 10,330,897 B2 | 6/2019 | Dror et al. |
| 10,356,332 B2 | 7/2019 | Cohen et al. |
| 10,371,928 B2 | 8/2019 | Goldenberg et al. |
| 10,372,022 B2 | 8/2019 | Avivi et al. |
| 10,379,371 B2 | 8/2019 | Avivi et al. |
| 10,437,020 B2 | 10/2019 | Dror et al. |
| 10,459,205 B2 | 10/2019 | Goldenberg et al. |
| 10,462,370 B2 | 10/2019 | Shi et al. |
| 10,462,379 B2 | 10/2019 | Zhou et al. |
| 10,469,735 B2 | 11/2019 | Shabtay et al. |
| 10,488,630 B2 | 11/2019 | Dror et al. |
| 10,488,631 B2 | 11/2019 | Bacher et al. |
| 10,498,961 B2 | 12/2019 | Goldenberg et al. |
| 10,509,209 B2 | 12/2019 | Shabtay et al. |
| 10,534,153 B2 | 1/2020 | Shabtay et al. |
| 10,540,806 B2 | 1/2020 | Yang et al. |
| 10,558,058 B2 | 2/2020 | Batcher et al. |
| 10,567,666 B2 | 2/2020 | Cohen et al. |
| 10,571,644 B2 | 2/2020 | Shabtay et al. |
| 10,571,665 B2 | 2/2020 | Shabtay et al. |
| 10,571,666 B2 | 2/2020 | Goldenberg et al. |
| 10,578,948 B2 | 3/2020 | Shabtay et al. |
| 10,613,303 B2 | 4/2020 | Goldenberg et al. |
| 10,616,484 B2 | 4/2020 | Cohen et al. |
| 10,620,450 B2 | 4/2020 | Shabtay et al. |
| 10,645,286 B2 | 5/2020 | Fridman et al. |
| 10,656,396 B1 | 5/2020 | Goldenberg et al. |
| 10,670,827 B2 | 6/2020 | Shabtay et al. |
| 10,670,879 B2 | 6/2020 | Goldenberg et al. |
| 10,678,029 B1 | 6/2020 | Goldenberg et al. |
| 10,726,579 B1 | 7/2020 | Huang |
| 10,812,717 B2 | 10/2020 | Liang et al. |
| 11,064,119 B2 | 7/2021 | Shi et al. |
| 11,190,689 B1 | 11/2021 | Wang et al. |
| 11,227,146 B2 | 1/2022 | Liang et al. |
| 2003/0038927 A1 | 2/2003 | Alden |
| 2004/0036844 A1 | 2/2004 | Wood et al. |
| 2005/0280714 A1 | 12/2005 | Freeman |
| 2008/0154908 A1 | 6/2008 | Datar et al. |
| 2008/0174822 A1 | 7/2008 | Kaimi et al. |
| 2009/0207266 A1 | 8/2009 | Yoda |
| 2009/0303343 A1 | 12/2009 | Drimbarean et al. |
| 2010/0053347 A1 | 3/2010 | Agarwala et al. |
| 2010/0149369 A1 | 6/2010 | Yasuda |
| 2010/0201709 A1 | 8/2010 | Yang et al. |
| 2011/0007175 A1 | 1/2011 | Fujita et al. |
| 2011/0085049 A1 | 4/2011 | Dolgin et al. |
| 2011/0090303 A1 | 4/2011 | Wu et al. |
| 2011/0141219 A1 | 6/2011 | Yeh |
| 2011/0234825 A1 | 9/2011 | Liu et al. |
| 2012/0050570 A1 | 3/2012 | Jasinski et al. |
| 2012/0218456 A1 | 8/2012 | Sweet et al. |
| 2013/0121597 A1 | 5/2013 | Hsu |
| 2013/0147923 A1 | 6/2013 | Zhou et al. |
| 2013/0242129 A1 | 9/2013 | Harmelling et al. |
| 2013/0314558 A1 | 11/2013 | Ju et al. |
| 2013/0342731 A1 | 12/2013 | Lee et al. |
| 2014/0126780 A1 | 5/2014 | Wang |
| 2014/0160309 A1 | 6/2014 | Karpenko |
| 2014/0313374 A1 | 10/2014 | Cao et al. |
| 2014/0368606 A1 | 12/2014 | Bassi |
| 2014/0369555 A1 | 12/2014 | Zhong et al. |
| 2015/0350548 A1 | 12/2015 | Beysserie et al. |
| 2015/0350550 A1 | 12/2015 | Thivent et al. |
| 2015/0362989 A1 | 12/2015 | Tyagi et al. |
| 2016/0004904 A1 | 1/2016 | Senechal et al. |
| 2016/0006935 A1 | 1/2016 | Zhou et al. |
| 2016/0112637 A1 | 4/2016 | Laroia et al. |
| 2016/0212332 A1 | 7/2016 | Tang et al. |
| 2016/0309065 A1 | 10/2016 | Karafin et al. |
| 2016/0337589 A1 | 11/2016 | Beysserie et al. |
| 2016/0360111 A1 | 12/2016 | Thivent et al. |
| 2017/0078576 A1 | 3/2017 | Ryu et al. |
| 2017/0111584 A1 | 4/2017 | Hong et al. |
| 2017/0213112 A1 | 7/2017 | Sachs et al. |
| 2017/0244881 A1 | 8/2017 | Stec |
| 2017/0272656 A1 | 9/2017 | Kurata |
| 2017/0287221 A1 | 10/2017 | Ghaly et al. |
| 2017/0295325 A1 | 10/2017 | Yoon et al. |
| 2017/0351932 A1 | 12/2017 | Uliyar et al. |
| 2017/0357873 A1 | 12/2017 | Roimela et al. |
| 2018/0027262 A1 | 1/2018 | Reinhard et al. |
| 2018/0048825 A1 * | 2/2018 | Wang .............. H04N 23/45 |
| 2018/0176483 A1 | 6/2018 | Knorr et al. |
| 2018/0181196 A1 | 6/2018 | Lee et al. |
| 2018/0220101 A1 | 8/2018 | Evans et al. |
| 2018/0240265 A1 | 8/2018 | Yang et al. |
| 2018/0260614 A1 | 9/2018 | Wang et al. |
| 2019/0104255 A1 | 4/2019 | Shi et al. |
| 2019/0259360 A1 | 8/2019 | Yoelin |
| 2019/0342497 A1 | 11/2019 | Liang et al. |
| 2020/0007770 A1 | 1/2020 | Shi et al. |
| 2020/0105291 A1 | 4/2020 | Sheaffer et al. |
| 2020/0236466 A1 | 7/2020 | Zhao et al. |

(56) References Cited

U.S. PATENT DOCUMENTS

| | | |
|---|---|---|
| 2020/0374460 A1 | 11/2020 | Liang et al. |
| 2021/0104208 A1 | 4/2021 | Goodsitt et al. |
| 2021/0117076 A1 | 4/2021 | Conn et al. |
| 2021/0289139 A1 | 9/2021 | Shi et al. |
| 2021/0329150 A1 | 10/2021 | Wang et al. |
| 2022/0075991 A1 | 3/2022 | Liang et al. |

FOREIGN PATENT DOCUMENTS

| | | |
|---|---|---|
| CN | 104079819 | 10/2014 |
| CN | 104769934 | 7/2015 |
| CN | 105306804 | 2/2016 |
| CN | 106101535 | 11/2016 |
| CN | 106780674 | 5/2017 |
| CN | 106954024 | 7/2017 |
| CN | 111738230 | 10/2020 |
| EP | 2219364 | 8/2010 |
| EP | 3167417 | 2/2020 |
| JP | 201485452 | 5/2014 |
| JP | 2016118701 | 6/2016 |
| KR | 20040077240 | 9/2004 |
| KR | 2008114264 | 9/2008 |
| WO | 2014005783 | 1/2014 |
| WO | 2015198478 | 12/2015 |
| WO | 2018005073 | 1/2018 |
| WO | 2019070333 | 4/2019 |
| WO | 2020033427 | 2/2020 |

OTHER PUBLICATIONS

Hollister, "How to guarantee the iPhone 13 Pro's macro mode is on", Retrieved at: https://www.theverge.com/22745578/iphone-13-pro-macro-mode-how-to, Oct. 26, 2021, 11 pages.

Konstantinova, et al., "Fingertip Proximity Sensor with Realtime Visual-based Calibration*", Oct. 2016, 6 pages.

"International Search Report and Written Opinion", Application No. PCT/US2021/040378, dated Oct. 25, 2021, 16 pages.

Ahmad, et al., "An Integrated Interpolation-based Super Resolution Reconstruction Algorithm for Video Surveillance", Journal of Communications, vol. 7, No. 6, Jun. 2012, pp. 464-472.

Bhat, et al., "Deep Burst Super-Resolution", Apr. 6, 2021, 15 pages.

Huang, "Localized Brightness Adjustment Method", Dec. 26, 2021, 11 pages.

Shin, "Enabling Enhanced Super-Resolution Photography Using Haptics Motor Vibration During Burst-Mode Capture on Smartphones", Technical Disclosure Commons—https://www.tdcommons.org/dpubs_series/4810, Dec. 26, 2021, 8 pages.

Yalanska, "UX Design: How to Make User Interface Readable", Accessed online at: https://blog.tubikstudio.com/ux-design-readable-user-interface/ on Oct. 5, 2021, 24 pages.

"AudioCapture-Premium Audio Experience for Your Video Recordings", Retrieved at: https://product.goodix.com/en/product/audioa_capture—on Mar. 8, 2021, 2 pages.

"Central Cylindrical Projection", retrieved from https://en.wikipedia.org/w/index.php?title=Central_cylindrical_projection&oldid=919200175, Obtained per link provided in Defensive Publication published Jun. 8, 2020, Oct. 2, 2019, 2 pages.

"EIS: a no trade-off user experience", retrieved from https://www.fotonation.com/products/digital-aperture/electronic-image-stabilization—on Oct. 13, 2017, 4 pages.

"Foreign Notice of Allowance", JP Application No. 2019-562259, dated Nov. 27, 2020, 6 pages.

"Foreign Office Action", CN Application No. 201980026280.4, dated Jun. 29, 2021, 14 pages.

"Foreign Office Action", EP Application No. 18762179.2, dated May 27, 2021, 4 pages.

"Foreign Office Action", EP Application No. 18762179.2, dated Sep. 21, 2020, 5 pages.

"Foreign Office Action", IN Application No. 201947044582, dated Oct. 7, 2021, 8 pages.

"Foreign Office Action", CN Application No. 201880030074.6, dated Dec. 31, 2020, 8 pages.

"Gallus: Video. Refined.", retrieved from https://www.yafla.com/gallus/, Jun. 16, 2017, 17 Pages.

"Homography (computer vision)", Retrieved from the Internet: URL<https://en.wikipedia.org/wiki/Homography (computer vision); retrieved on Apr. 9, 2020, 9 pages.

"How ZeroShake works", retrieved from http://www.zeroshake.com/in-depth/how-it-works/—Oct. 13, 2017, 3 Pages.

"Image Stabilization", From Wikipedia, the free encyclopedia, last modified on Sep. 28, 2015 [retrieved on Oct. 13, 2015]. Retrieved from the Internet: URL<https://en.wikipedia.org/wiki/Image stabilization#Optical image stabilization, 4 pages.

"Image stabilization", Retrieved from https://en.wikipedia.org/wiki/Image_stabilization, Last updated on Aug. 24, 2017, 7 Pages.

"Inertial Measurement Unit", retrieved from https://en.wikipedia.org/wiki/Inertial_measurement_unit—Last updated on Sep. 28, 2017, 3 Pages.

"Infinite Impulse Response", From Wikipedia, the free encyclopedia, last modified on Sep. 7, 2015 [retrieved on Oct. 13, 2015]. Retrieved from the Internet: URL<https://en.wikipedia.org/wiki/Infinite_impulse_response, 4 pages.

"International Preliminary Report on Patentability", Application No. PCT/US2018/044524, dated Apr. 8, 2020, 8 pages.

"International Preliminary Report on Patentability", Application No. PCT/US2019/027934, dated Nov. 19, 2020, 9 pages.

"International Search Report and Written Opinion", Application No. PCT/US2016/053252, dated Dec. 23, 2016, 14 pages.

"International Search Report and Written Opinion", Application No. PCT/US2019/027934, dated Jul. 8, 2019, 16 pages.

"International Search Report and Written Opinion", Application No. PCT/US2018/044524, dated Oct. 24, 2018, 16 Pages.

"Mercator Projection", retrieved from https://en.wikipedia.org/w/index.php?title=Mercator_projection&oldid=955134599, Obtained per link provided in Defensive Publication published Jun. 8, 2020, Jun. 15, 2020, 15 pages.

"Nokia OZO Audio", OZO.Nokia.com—Retrieved on Feb. 10, 2021, 2020, 16 pages.

"Non-Final Office Action", U.S. Appl. No. 16/941,775, dated May 3, 2021, 4 pages.

"Non-Final Office Action", U.S. Appl. No. 16/568,931, dated Jan. 12, 2021, 35 pages.

"Non-Final Office Action", U.S. Appl. No. 16/235,037, dated Oct. 3, 2019, 6 pages.

"Non-Final Office Action", U.S. Appl. No. 15/724,241, NFOA from parent application, dated Oct. 5, 2018, 10 Pages.

"Notice of Allowance", U.S. Appl. No. 16/989,566, dated Sep. 1, 2021, 11 pages.

"Notice of Allowance", U.S. Appl. No. 16/941,775, dated Jul. 26, 2021, 5 pages.

"Notice of Allowance", U.S. Appl. No. 16/235,037, dated Mar. 26, 2020, 8 pages.

"Notice of Allowance", U.S. Appl. No. 16/568,931, dated Apr. 14, 2021, 8 pages.

"Notice of Allowance", U.S. Appl. No. 15/972,044, dated Aug. 29, 2018, 8 pages.

"Notice of Allowance", U.S. Appl. No. 16/235,037, dated Jun. 8, 2020, 8 pages.

"Notice of Allowance", U.S. Appl. No. 15/724,241, NOA from parent case, dated Jun. 14, 2019, 14 Pages.

"Observations by at least some of the inventors of U.S. Appl. No. 15/972,044", dated May 14, 2018, 1 page.

"Optical Image Stabilization (OIS)", retrieved from https://www.rohm.com/documents/11303/41217/OIS-white-paper.pdf—on Oct. 12, 2017, Copyright 2013, 13 Pages.

"PCT International Search Report and Written Opinion", PCT/US2018/044524, dated Oct. 24, 2018, 16 pages.

"Preliminary Report on Patentability", PCT Application No. PCT/US2018/044524, dated Apr. 8, 2020, 8 Pages.

"Preliminary Report on Patentability", PCT Application No. PCT/US2016/053252, dated Apr. 26, 2018, 9 pages.

(56) References Cited

OTHER PUBLICATIONS

"Smooth Camera Transition—Continuous and Smooth Zoom for Images and Videos", retrieved from https://corephotonics.com/inventions/smooth-camera-transition/ on Apr. 17, 2020; Core Photonics, Dec. 16, 2019, 5 pages.

"SteadXP—Video stabilization made simple", retrieved from https://www.kickstarter.com/projects/1091165875/steadxp-the-future-of-video-stabilization—on Oct. 13, 2017, Last updated Jul. 2, 2017, 26 Pages.

"Stereographic Projection", retrieved from https://en.wikipedia.org/w/index.php?title=Stereographic_projection&oldid=954632592, Obtained per link provided in Defensive Publication published Jun. 8, 2020, 16 pages.

Albrecht, et al., "Omnidirectional Video Stabilisation on a Virtual Camera Using Sensor Fusion", 11th International Conference Control, Automation, Robotics and Vision, Dec. 2010, 7 pages.

Baker, et al., "Removing Rolling Shutter Wobble", Proceedings of the IEEE Conference on Computer Vision and Pattern Recognition, Jun. 2010, 8 pages.

Barrett, Brian , "Microsoft Hyperlapse Smooths Out Android Phone Shaky Cams", retrieved from https://www.wired.com/2015/05/microsoft-hyperlapse/, May 15, 2015, 11 Pages.

Bell, Steven et al., "A Non-Linear Filter for Gyroscope-Based Video Stabilization", Springer; Stanford University; NVIDIA Research, Sep. 2014, 15 pages.

Chang, Meng et al., "Low-light Image Restoration with Short-and-long-exposure Raw Pairs", Jul. 1, 2020, 12 pages.

Cho, et al., "CMOS Digital Image Stabilization", IEEE Transactions on Consumer Electronics, IEEE Service Center, New York, NY, US, vol. 53 No. 3, Aug. 1, 2007, 8 pages.

Crawford, et al., "Gradient Based Dominant Motion Estimation with Integral Projections for Real Time Video Stabilisation", International Conference on Image Processing (ICIP), vol. 5, Oct. 2004, 4 pages.

Dabove, P. et al., "Inertial sensors for smartphones navigation", retrieved from https://springerplus.springeropen.com/articles/10.1186/s40064-015-1572-8, Dec. 30, 2015,13 Pages.

Forbes, Dennis , "Optical vs. Electronic Image Stabilization", retrieved from https://dennisforbes.ca/index.php/2016/10/27/optical-vs-electronic-image-stabilization/, Oct. 27, 2016,14 Pages.

Forbes, Dennis , "The Poorly Timed Insanity of Android", retrieved from https://dennisforbes.ca/index.php/2015/03/30/the-poorly-timed-insanity-of-android, Mar. 30, 2015, 7 Pages.

Grundman, et al., "Video Stabilization on YouTube", Google Research Blog, May 4, 2012 [retrieved on Oct. 13, 2015]. Retrieved from the Internet: URL<http://googleresearch.blogspot.de/2012/05/video-stabilization-on-youtube.html>, 7 pages.

Grundmann, et al., "Auto-directed Video Stabilization with Robust L Optimal Camera Paths", IEEE Explore, Jun. 20, 2011, 8 pages.

Gupta, Aman , "Techniques for Automatically Determining a Time-Lapse Frame Rate", Technical Disclosure Commons, Retrieved from https://www.tdcommons.org/dpubs_series/3237, May 15, 2020, 11 pages.

Hartley, et al., "Multiple View Geometry in Computer Vision, Second Edition", Cambridge University Press, 2003, pp. 99-112.

Hong, Wei et al., "Image Deblurring According to Facially Recognized Locations Within the Image", Technical Disclosure Commons, https://www.tdcommons.org/dpubs_series/4193, Mar. 26, 2021, 9 pages.

Huth, Johannes et al., "Significantly Improved Precision of Cell Migration Analysis in Time-Lapse Video Microscopy Through Use of a Fully Automated Tracking System", Apr. 2010, 12 pages.

Jackson, Ian , "The Creative and Technical Differences Between Full Frame and S-35", Accessed from: https://vmi.tv/training/useful-stuff/differences-between-full-frame-and-s-35, Feb. 2020, 19 pages.

Kao, Wen-Chung et al., "An Overview of Image / Video Stabilization Techniques", In "Single-Sensor Imaging Methods and Applications for Digital Cameras", CRC Press, Boca Raton, Florida, Dec. 31, 2018, 27 pages.

Kao, Wen-Chung et al., "An Overview of Image/Video Stabilization Techniques", CRC Press, Jan. 2008, 28 Pages.

Karpenko, Alexandre et al., "Digital Video Stabilization and Rolling Shutter Correction using Gyroscopes", Retrieved from https://graphics.stanford.edu/papers/stabilization/, Mar. 2011, 7 Pages.

Karpenko, Alexandre et al., "Digital Video Stabilization and Rolling Shutter Correction using Gyroscopes", Stanford Tech Report CTSR, Mar. 2011, 7 pages.

Koppel, et al., "Robust and Real-Time Image Stabilization and Rectification", Application of Computer Vision, 2005. WACV/MOTIONS '05 vol. 1. Seventh IEEE Workshops, Jan. 2005, 6 pages.

Lavry, "Understanding IIR (Infinite Impulse Response) Filters—An Intuitive Approach", Lavry Engineering, 1997, 5 pages.

Li, , "Scene-Aware Audio for 360° Videos", May 12, 2018, 12 pages.

Liu, et al., "Bundled camera paths for video stabilization", ACM Transactions on Graphics, vol. 32, Jul. 11, 2013, 10 pages.

Ma, et al., "Video Stabilization and Face Saliency-based Retargeting", Stanford Course, Oct. 1, 2016, 7 pages.

Ma, et al., "Video Stabilization and Face Saliency-based Retargeting", Jan. 2016, 7 pages.

Miller, Ross , "Hyperlapse's secret best feature: fixing your shaky hands", retrieved from https://www.theverge.com/2014/10/13/6968699/hyperlapse-is-really-good-at-stabilized-video, Oct. 13, 2014, 5 Pages.

Mourcou, Quentin et al., "Performance Evaluation of Smartphone Inertial Sensors Measurement for Range of Motion", retrieved from mdpi.com/journals/sensors vol. 15, Issue 9, Sep. 15, 2015, 20 Pages.

Mustaniemi, Janne et al., "LSD—Joint Denoising and Deblurring of Short and Long Exposure Images with CNNs", Sep. 1, 2020, 21 pages.

Oth, Luc et al., "Rolling Shutter Camera Calibration", retrieved from https://ieeexplore.ieee.org/document/6619023, Oct. 2013, 8 Pages.

Rawat, et al., "Review of Motion Estimation and Video Stabilization Techniques for Handheld Mobile Video", Signal & Image Processing: An International Journal (SIPIJ), Jun. 2011, 12 pages.

Roth, "Homography", ECCD, COMP 4900, Class Note, Fall 2009, 22 pages.

Shi, Fuhao et al., "Steadiface: Real-Time Face-Centric Stabilization on Mobile Phones", May 3, 2019, 5 pages.

Shih, Yichang et al., "Distortion-Free Wide-Angle Portraits on Camera Phones", ACM Transactions on Graphics, vol. 38, No. 4, Article 61; Retrieved from https://doi.org/10.1145/3306346.3322948, Jul. 2019, 12 pages.

Shih, Yichang et al., "Techniques for Deblurring Faces in Images by Utilizing Multi-Camera Fusion", Technical Disclosure Commons—https://www.tdcommons.org/dpubs_series/4274, May 5, 2021, 9 pages.

Shih, Yichang et al., "Techniques for Wide-Angle Distortion Correction Using an Ellipsoidal Projection", Technical Disclosure Commons; Retrieved from https://www.tdcommons.org/dpubs_series/3299, Jun. 8, 2020, 9 pages.

Talvala, Eino-Ville et al., "Techniques and Apparatuses for Variable-Display Devices to Capture Screen-Fitting Images with a Maximized Field of View", Technical Disclosure Commons; Retrieved from https://www.tdcommons.org/dpubs_series/3388, Jun. 29, 2020, 8 pages.

Tian, Yuandong et al., "Globally Optimal Estimation of Nonrigid Image Distortion", International journal of computer vision, 98(3), Jul. 2012, 27 pages.

Unknown Author, , "The Homography Transformation", CorrMap, 2013 [retrieved on Oct. 13, 2015]. Retrieved from the Internet: URL<http://www.corrmap.com/features/homographytransformation.php>, 5 pages.

Vanhemert, Kyle , "Killer Software that Finally Stabilizes Shaky Gopro Videos", www.wired.com; Aug. 14, 2014, 9 pages.

Wei, et al., "Relative Pose Estimation Algorithm with Gyroscope Sensor", Journal of Sensors vol. 2016, Article ID 8923587, Oct. 27, 2016, 9 pages.

(56) References Cited

OTHER PUBLICATIONS

Wilkie, , "Motion stabilisation for video sequences", Imperial College London, Department of Computing, Final Year Project, Jun. 18, 2003, 63 pages.
Yang, Ruiduo et al., "Improved Object Detection in an Image by Correcting Regions with Distortion", Technical Disclosure Commons; Retrieved from https://www.tdcommons.org/dpubs_series/3090, Apr. 1, 2020, 8 pages.
Yuan, Lu et al., "Image Deblurring with Blurred/Noisy Image Pairs", Jul. 29, 2007, 10 pages.
Zhang, Michael , "Google Explains Why the Pixel Doesn't Have Optical Image Stabilization", Oct. 11, 2016, 11 Pages.
"Foreign Office Action", CN Application No. 202110599340.0, dated Jul. 21, 2022, 23 pages.
"Non-Final Office Action", U.S. Appl. No. 17/529,808, dated Sep. 14, 2022, 18 pages.
"Foreign Office Action", EP Application No. 19723253.1, dated Nov. 4, 2022, 5 pages.
"Notice of Allowance", U.S. Appl. No. 17/336,194, dated Sep. 21, 2022, 10 pages.

\* cited by examiner

MULTI-CAMERA VIDEO STABILIZATION

RELATED APPLICATIONS

This application is a continuation of U.S. application Ser. No. 16/941,775, filed on Jul. 29, 2020, the disclosure of which is incorporated by reference herein in its entirety.

BACKGROUND

Some devices, such as smartphones, include multiple camera modules. These cameras may be used to record still images or video. In many situations, hand shake and other movements of a device can reduce the quality of captured images and video. As a result, some devices include image stabilization features to improve the quality of recorded image data.

SUMMARY

In some implementations, a device includes a multi-view camera system, e.g., a device with multiple camera modules having different fields of view. The device provides video stabilization for video captured using one or more of the camera modules of the device. This can include providing varying levels of image stabilization at different levels of zoom (e.g., enlargement or magnification) and managing the image stabilization behavior to be consistent for different zoom levels and for the different camera modules. Even when the camera modules have fixed fields of view, the device can provide zoom functionality, e.g., by implementing or approximating continuous or smooth zoom along a range of fields of view using digital zoom techniques. The device can provide features to capture consistently stabilized video over a range of zoom settings, including when transitioning between video capture of different camera modules during video recording. In some implementations, the device detects when to transition between cameras for image capture during video recording. The device carries out the transition and processes the captured data to produce output that is seamless over the period of transition, e.g., output video that maintains or smoothly adjusts parameters such as field of view, image stabilization, exposure, focus, noise, and so on. This can allow the system to generate a video that uses video from different cameras at different portions, with transitions between the cameras that are not disruptive to a viewer, e.g., without monocular disparity, visible stutter, pause in apparent zoom, or other glitches.

A primary goal of the system is to enhance the video scene smoothness presented to users. In other words, the system attempts to achieve both scene temporal continuity (e.g., reducing unwanted camera shake over time) as well as scene spatial continuity (e.g., reducing difference between video captured from different cameras). This involves two important technologies: (1) electronic image stabilization (EIS), which provides scene continuity on a single camera over time, effectively providing temporal smoothing for a scene shown in a video feed, and (2) enhanced multi-camera digital zoom (e.g., a gradual, incremental, or substantially continuous zoom using output of multiple cameras), which provides scene continuity among different cameras, effectively providing a spatial smoothing method to avoid dislocation or disruption around transitions between cameras.

The EIS and multi-camera digital zoom can be efficiently combined by using various techniques and transformations discussed further below, including the use of a "canonical" camera space to represent image data. The canonical space can represent the view of a conceptual camera that has fixed intrinsic characteristics that will not change over time. For example, the canonical space can be one that is not affected by factors such as optical image stabilization (OIS) or voice coil motor (VCM) position and rolling shutter effects.

As an example, a device can include a first camera and a second camera that provide different fields of view of a scene. The device can enable zoom functionality allowing a user to smoothly change the zoom or magnification represented by the output video, even though one or more of the camera modules have a fixed field of view. In some implementations, two or more camera modules with fixed focal length lenses can be used to simulate a continuous zoom over a range by (1) using digital zoom (e.g., cropping and/or enlargement) based on images from the first camera for a first portion of the zoom range and (2) using digital zoom based on images from the second camera for a second portion of the zoom range. To enhance the overall quality of the video, image stabilization processing can be dynamically adjusted for the current level of digital zoom applied. For example, each change in zoom along the simulated continuous zoom range can have a corresponding change in image stabilization parameters.

Image processing by the device can manage transitions between image capture from the different cameras to provide a substantially seamless transition, while maintaining consistency of EIS application and other image capture aspects, such as focus distance, exposure, and so on. The zoom functionality can include digital zoom using output of the first camera, e.g., as the device increasingly crops in on the images captured by the first camera. Then, once a threshold level of zoom is reached and the zoomed-in area is within the field-of-view of the second camera, the device switches to recording video captured using the second camera.

To cause the recorded video to provide a smooth transition between the outputs of the different cameras, the device can use a series of transformations to relate the output of the second camera to the output of the first camera. These transformations may be implemented using homography matrices or in other forms. In some implementations, the transformations involve mapping the image from the second camera to a canonical camera space, by removing camera-specific and time-dependent contributions from the second camera, such as rolling shutter effects, OIS lens movement, and so on. A second transformation can project the image data in the second camera's canonical image space to the canonical image space of the first camera. This can align the field of view of the second camera with the field of view of the first camera and account for spatial differences (e.g., offsets) between the cameras in the device. Electronic image stabilization (EIS) processing can then be applied to the image data in the canonical image space for the first camera. This series of transformations provides a much more efficient processing technique than, for example, trying to relate and align EIS-processed second camera image data with EIS-processed first camera image data. The EIS processing can be performed in a single camera space or reference frame, despite the images being captured using different cameras with different fields of view, different intrinsic characteristics during image capture, and so on. The output of the EIS processing in the canonical image space for the first camera can then be provided for storage as a video file (locally and/or remotely) and/or streamed for display (locally and/or remotely).

The techniques can apply levels of image stabilization that are tailored for the current zoom level to more effectively control hand shake and other unintentional camera movements. In addition, the ability to smoothly transition between cameras during video capture can increase the resolution of video capture without disruptive transitions. For example, as digital zoom is increasingly applied to the output of the camera with the wider field of view, the resolution tends to decrease. As digital zoom increases, the resulting output image represents a smaller portion of the image sensor and thus uses fewer pixels of the image sensor to generate the output image. A second camera can have a lens with a narrower field of view, allowing the narrower field of view to be captured with the entirety of the image sensor. When the video is zoomed in to the point that the output frame falls within the field of view of the second camera, the camera can transition video capture to using image data captured by the second camera. Thus, while continuing to capture and record a video file, and with EIS being continuously and consistently applied, the camera can switch between using the different cameras for video capture in a substantially seamless manner. The switch can be made transparent to the user, so the switch between cameras is not noticeable in the captured video footage or optionally in the user interface for the user.

In general, the process of performing video capture and related image processing can be computationally expensive, especially for high-resolution video capture. The techniques discussed herein provide for computationally efficient techniques for managing the image stabilization processing and transitions between camera modules by, among other techniques, mapping the image data of both cameras to a single, common reference space before applying the same type of EIS processing to the image data in that reference space. The reference space may be one in which time-dependent effects have been removed, which further reduces the computation required for aligning images from different cameras and applying EIS processing.

In some implementations, the techniques discussed herein are implemented on battery-powered devices with limited power budgets and limited computational resources, such as phones, tablet computers, and other mobile devices. The processing discussed can be performed efficiently by a device on battery power, which performs the stabilization processing substantially in real-time, concurrent with ongoing video capture, e.g., with image-stabilization-processed video output saved or streamed as video capture continues. Also, as discussed below, the techniques can adjust the capture of video using the camera modules, e.g., to adjust camera module settings for focus, exposure, etc. and to switch which camera module is used at different times. These techniques are also performed efficiently so that they can be performed in real time as video is captured, processed, and recorded while additional video is continuing to be captured.

In one general aspect, a method includes: providing, by a video capture device having a first camera and a second camera, a digital zoom capability permitting user-specified magnification changes within a digital zoom range during video recording, wherein the video capture device is configured to (i) use video data captured by the first camera over a first portion of the digital zoom range and (ii) use video data captured by the second camera over a second portion of the digital zoom range; and while capturing video using the second camera of the video capture device to provide a zoom level in the second portion of the zoom range, processing image data captured using the second camera by applying a set of transformations including (i) a first transformation to a second canonical reference space for the second camera, (ii) a second transformation to a first canonical reference space for the first camera, and (iii) a third transformation to apply electronic image stabilization to image data in the first canonical reference space for the first camera.

In some implementations, the method includes, while capturing video using the first camera of the video capture device to provide a zoom level in the first portion of the zoom range, processing image data captured using the second camera by applying a set of transformations including (i) a transformation to the first canonical reference space for the first camera, and (ii) a transformation to apply electronic image stabilization to data in the first canonical reference space for the first camera.

In some implementations, the first camera and the second camera have different fields of view, and wherein (i) the field of view of the second camera is included within the field of view of the first camera or (ii) the field of view of the first camera is included within the field of view of the second camera.

In some implementations, the first camera and the second camera each include a fixed-focal-length lens assembly.

In some implementations, the canonical reference space for the second camera and the canonical reference space for the first camera are conceptual camera spaces defined by a predetermined, fixed set of camera intrinsic properties such that projecting image data to the canonical reference spaces removes time-dependent effects during capture of a video frame.

In some implementations, the first camera includes an optical image stabilization (OIS) system and the first canonical reference space for the first camera is one in which image data is represented having a consistent, predetermined OIS position.

In some implementations, the second camera includes an optical image stabilization (OIS) system and the second canonical reference space for the second camera is one in which image data is represented having a consistent, predetermined OIS position.

In some implementations, the first camera provides image data that captures image scanlines of an image frame progressively and the first canonical reference space for the first camera is one in which image data has been corrected to remove distortion due to progressive capture for the image scanlines.

In some implementations, the second camera provides image data that captures image scanlines of an image frame progressively and the second canonical reference space for the second camera is one in which image data has been corrected to remove distortion due to progressive capture for the image scanlines.

In some implementations, the second transformation aligns a field of view of the second camera to a field of view of the first camera and adjusts for a spatial offset between the first camera and the second camera.

In some implementations, the first transformation, the second transformation, and the third transformation each have a corresponding homography matrix, and processing the image data includes applying the homography matrices.

In some implementations, the method includes: during capture of video data using the first camera and processing of the video data from the first camera to apply electronic image stabilization, receiving user input indicating a change of zoom level to a particular zoom level in the second portion of the zoom range. The method can include, in response to receiving the user input: recording a sequence of video frames in which a magnification of video frames captured using the first camera is incrementally increased until a predetermined zoom level is reached, initiating video capture using the second camera, and recording a second sequence of video frames captured using the second camera, the second sequence of video frames providing the predetermined zoom level and providing increasing magnification of video frames captured using the second camera until the particular zoom level is reached.

In some implementations, the second transformation is determined based at least in part on a focus distance of the second camera.

In some implementations, the first transformation includes a plurality of different adjustments for different scanlines of the image data captured using the second camera.

In some implementations, the third transformation includes electronic image stabilization for video frames that uses, for each particular video frame of the video frames, one or more video frames prior to the particular video frame and one or more video frames after the particular video frame.

In some implementations, the second camera has a smaller field of view than the first camera. The method can include: during image capture using the first camera, receiving user input indicating a change of zoom level for video capture; and in response to receiving the user input, determining whether the changed zoom level is greater than or equal to a predetermined transition zoom level, wherein the predetermined transition zoom level represents a field of view that is smaller than the field of view of the second camera.

In some implementations, the method includes: storing data indicating (i) a first transition zoom level for transitioning from video capture using the first camera to video capture using the second camera, and (ii) a second transition zoom level for transitioning from video capture using the second camera to video capture using the first camera, wherein the first transition zoom level is different from the second transition zoom level; and determining whether to switch between cameras for video capture by (i) comparing a requested zoom level to the first transition zoom level when the requested zoom level corresponds to a decrease in field of view, and (ii) comparing the requested zoom level to the second transition zoom level when the requested zoom level corresponds to an increase in field of view.

In some implementations, the first transition zoom level corresponds to a smaller field of view than the second transition zoom level.

In some implementations, the method includes: during recording of a video file, determining to switch from capturing video using a particular camera of the cameras to capturing video using the other of the cameras; and in response to determining to switch: determining a value for a video capture parameter being used for image capture using the particular camera, setting a value for a video capture parameter for the other camera based on the determined video capture parameter, and after setting the value for the video capture parameter for the other camera, initiating video capture from the second camera and recording captured video from the second camera in the video file. Setting the video capture parameter includes adjusting, for the second camera, one or more of exposure, image sensor sensitivity, gain, image capture time, aperture size, lens focus distance, OIS status, or OIS level.

Other embodiments of this aspect and others discussed herein include corresponding systems, apparatus, and computer programs, configured to perform the actions of the methods, encoded on computer storage devices. A system of one or more computers or other devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

In another general aspect, one or more machine-readable media store instructions that, when executed by one or more processors, cause execution of operations comprising: providing, by a video capture device having a first camera and a second camera, a digital zoom capability permitting user-specified magnification changes within a digital zoom range during video recording, wherein the video capture device is configured to (i) use video data captured by the first camera over a first portion of the digital zoom range and (ii) use video data captured by the second camera over a second portion of the digital zoom range; and while capturing video using the second camera of the video capture device to provide a zoom level in the second portion of the digital zoom range, processing image data captured using the second camera by applying a set of transformations including (i) a first transformation to a second canonical reference space for the second camera, (ii) a second transformation to a first canonical reference space for the first camera, and (iii) a third transformation to apply electronic image stabilization to image data in the first canonical reference space for the first camera.

In another general aspect, a video capture device includes: a first camera having a first field of view; a second camera having a second field of view; one or more position or orientation sensors; one or more processors; and one or more data storage devices storing instructions that, when executed by one or more processors, cause execution of operations comprising: providing, by a video capture device having a first camera and a second camera, a digital zoom capability permitting user-specified magnification changes within a digital zoom range during video recording, wherein the video capture device is configured to (i) use video data captured by the first camera over a first portion of the digital zoom range and (ii) use video data captured by the second camera over a second portion of the digital zoom range; and while capturing video using the second camera of the video capture device to provide a zoom level in the second portion of the digital zoom range, processing image data captured using the second camera by applying a set of transformations including (i) a first transformation to a second canonical reference space for the second camera, (ii) a second transformation to a first canonical reference space for the first camera, and (iii) a third transformation to apply electronic image stabilization to image data in the first canonical reference space for the first camera.

In some implementations, the first camera and the second camera have different fields of view, and the field of view of the second camera is included within the field of view of the first camera. The first camera and the second camera can each include a fixed-focal-length lens assembly.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
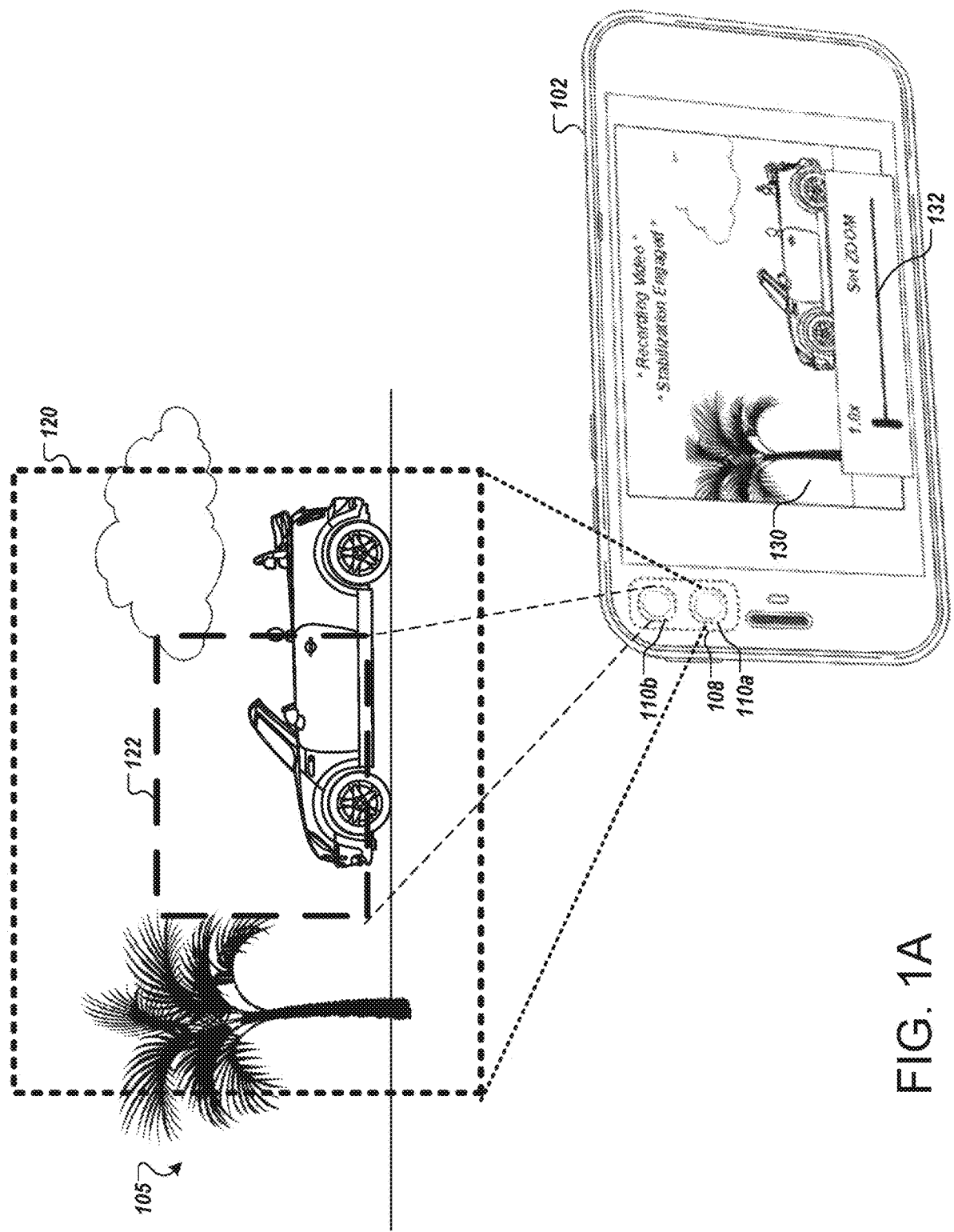
FIGS. 1A-1B are diagrams showing an example of a device providing multi-camera video stabilization.
Figure 1B:
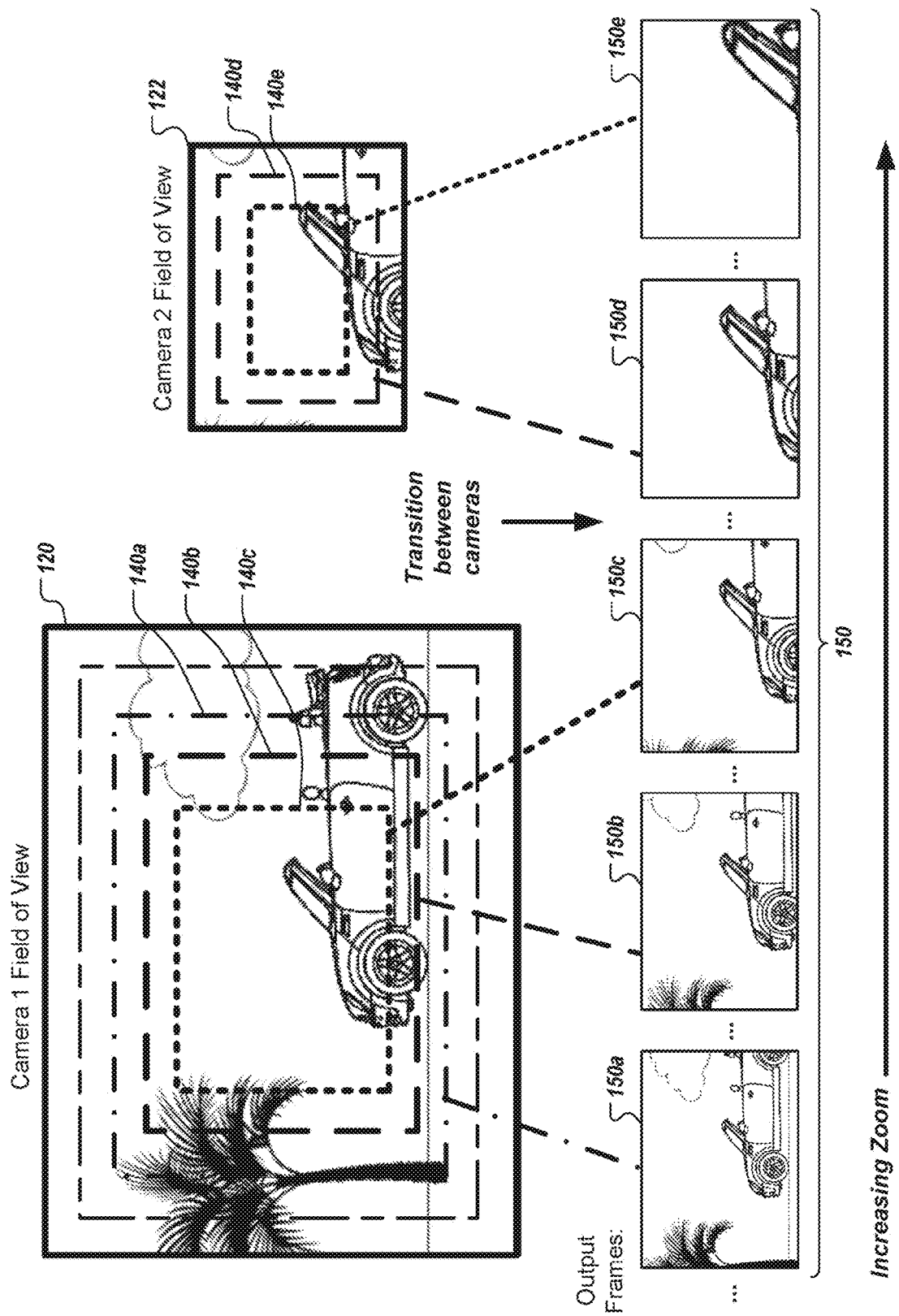

FIGS. 1A-1B are diagrams showing an example of a device 102 providing multi-camera video stabilization. Video stabilization is often an important feature for camera systems of mobile devices. With traditional, single-camera video stabilization, video frames can be transformed from the image data actually captured during a shaky real camera trajectory to a stabilized output for a time-smoothed virtual camera trajectory. With a single camera, frames acquired during the real camera trajectory can be projected to altered output frames representing frames along a smoothed virtual camera trajectory.

Some devices include multiple cameras that face the same direction (e.g., on the same side of the device), arranged to capture different fields of view of a same scene. In the multi-camera system, the device may switch between the cameras over the course of capturing a video, in a manner that a single video includes segments captured using different cameras. When the switch between cameras occurs, there is no longer a single real camera trajectory because there are different real cameras being used. Nevertheless, the device should maintain the same virtual camera trajectory to preserve continuity and smoothness in the captured footage, even during the period of transition between cameras. As discussed herein, the virtual camera trajectory can be maintained between multiple cameras and smoothed over time so that the switch between cameras does not cause distracting or disruptive effects (e.g., stutter, image offsets or abrupt change in field of view, interruption in stabilization or abrupt change in stabilization level applied, etc.).

The multi-camera video stabilization system can be implemented to provide various benefits. In addition to smoothing video over time, transitions between periods of video capture of different cameras can be smoothed also. In addition, the technique can be sufficiently efficient to operate in real time, e.g., for applying smoothing to captured video concurrently with continued video capture, and to conserve power to allow extended use by battery-operated devices.

In the example of FIG. 1A, the device 102 is illustrated as a phone, but may be another type of device, such as a tablet computer, a camera, etc. The device 102 includes a multi-camera module 108 that includes a first camera 110a and a second camera 110b. The two cameras 110a, 110b are arranged on the same side of the device 102 and so both are arranged to capture images of a same scene 105 facing the device 102 (e.g., at the back side of the phone illustrated). The cameras 110a, 110b can be rigidly coupled together and to the device 102, so that the cameras 110a, 110b move together to the same extent and in the same motion as the device 102.

The cameras have different fields of view. For example, the first camera 110a has a first field of view 120, and the second camera 110b has a second field of view 122 that is narrower than the first field of view 120. Although the fields of view 120, 122 may differ significantly, the two cameras 110a, 110b may have similar image resolution. The two fields of view 120, 122 can overlap. In particular, the field of view 122 of the second camera 110b can be entirely contained within the field of view 120 of the first camera 110a. As an example, the first field of view 120 may be 77 degrees and the second field of view 122 may be 52 degrees, with the 52-degree field of view 122 being mostly or completely within the 77-degree field of view 120. In the example, the cameras 110a, 110b each use fixed-focal-length lenses, e.g., lens assemblies without optical zoom. In other words, the lens focal length for each camera 110a, 110b may be fixed, apart from focus-related effects such as focus breathing.

One or more of the cameras 110a, 110b may include optical image stabilization (OIS) modules to reduce the impact of camera shake and other unwanted movements of the device 102. Whether the cameras 110a, 110b include OIS modules or not, the device 102 can use electronic image stabilization (EIS) to smooth the captured video over time. As discussed further below, the EIS processing can apply transformations to the captured frames to project the captured frames, which were taken along a shaky actual camera trajectory, to stabilized output frames, which represent the smoothed or filtered trajectory of a virtual camera.

The device 102 uses the cameras 110a, 110b to provide an effective zoom range that uses image capture from different cameras 110a, 110b at different magnification levels. The device 102 may provide a zoom range using digital zoom techniques applied to outputs of different cameras 110a, 110b at different portions of the zoom range. As an example, the device may provide an overall zoom range of 1.0× to 3.0×. The camera 110a providing the wider field of view 120 may be used to capture images for a first portion of the zoom range, e.g., 1.0× to 1.8×. Once the zoom reaches a particular level, such as a predetermined transition point, e.g., 1.8×, then the device 102 switches from capturing video with the first camera 110a to capturing video using the second camera 110b. The camera 110b providing the narrower field of view 122 may be used to capture images for the second portion of the zoom range, e.g., 1.8× to 3.0×.

The illustrated example shows that the device 102 includes a display allowing a user to view captured video 130 as it is being captured and recorded by the device 102. The device 102 can provide a user with a control 132 to dynamically adjust the zoom level during video capture. In the example, the control 132 is an on-screen slider control, shown on a touchscreen of the device 102, that lets a user set the zoom to a desired position along the zoom range. In some implementations, the zoom level adjusts in fine-grained increments, e.g., in steps of 0.2×, 0.1×, or smaller, allowing the user to gradually move through the supported zoom range in a manner that substantially approximates a continuous zoom over the zoom range.

FIG. 1B shows an example of how different zoom levels can be provided using the outputs from the cameras 110a, 110b. The respective fields of view 120, 122 are shown, along with cropped portions 140a-140e that can be used to provide different zoom levels. Output frames 150a-150e show example frame outputs that might be provided at different zoom levels. Note that because the two cameras 110a, 110b are physically offset from each other in the device 102, there are differences in the view of the scene. Even though the two cameras are viewing the same scene, objects in the scene would have slightly different positions in the outputs of the cameras due to monocular disparity. The image transformations discussed further below can correct for this disparity and other differences between the outputs of the cameras 110a, 110b.

The output frames 150a-150c are each derived from image data from the first camera 110a which provides the wider field of view 120. When the zoom level reaches a threshold, such as 1.8×, the device 102 switches to using image data captured by the second camera 110b that provides the narrower field of view 122. The transition between cameras 110a, 110b can take place at a zoom level at which the zoom level is entirely contained within the field of view 122 of the second camera 110b, so that sufficient image data is present to fill the output frame at the desired zoom level. In some implementations, the device 102 is configured to perform the transition once the zoom level corresponds to an area that is less than the full output of the second camera 110b, to preserve a margin of captured data that can be used for EIS processing.

In general, to maximize output quality, it is advantageous to switch to the narrower field of view 122 near the zoom level at which the field of view 122 can fill the output frame. This is because the narrower field of view 122 will provide a higher resolution for that region of the scene. Although the two cameras 110a, 110b may have similar resolutions, at the narrower field of view 122 the camera 110b can use its full resolution to capture the view of the scene, while the same view would be captured with only a fraction of the resolution of the wider camera 110a. In the example, there is a zoom level, e.g., 1.7×, at which the zoomed-in field of view 140c for the first camera 110a matches the full field of view 122 of the second camera 110b. At this point, only a fairly small portion of the image sensor for the first camera 110a is being used to provide the output frame 150c, and so the output frame 150c may be of a lower resolution or lower quality than is provided at wider zoom levels. By contrast, the full resolution of the image sensor of the second camera 110b can be used to provide that level of effective zoom or magnification, resulting in a higher quality of output. By switching to the second camera 110b at or soon after the equilibrium point (e.g., 1.7×), the device 102 can provide greater quality at that zoom level and at further zoom levels.

In some implementations, the zoom level set for switching between cameras 110a-110b is set after the point that the second camera 110b can fill the image frame. For example, the transition point can be set at a zoom level that provides a margin to account for the monocular disparity arising from the different physical positions of the cameras 110a, 110b. As a result, if the second camera 110b could fill the frame at a zoom level of 1.7×, the device 102 may nevertheless delay switching to capture using the second camera 110b until a zoom of, e.g., 1.8× or 1.9×, so that the full sensor output from the camera 110b provides a buffer region of image data (e.g., at the edges surrounding the region representing the desired frame capture area), so that any offsets or other adjustments needed to correct for monocular disparity can be made, e.g., to align the field of view 122 with the magnified areas of the field of view 120 and still fill the output frame.

The device 102 applies video stabilization, e.g., smoothing of camera motion apparent in frames over time to reduce or eliminate the effects of movement of the device 102. The device 102 can perform the video stabilization, e.g., EIS processing, in real time or near real time, e.g., concurrently with ongoing video capture for the video being stabilized. The video stabilization smoothing over time (e.g., over multiple frames) can be coordinated with the transitions between cameras 110a, 110b as zoom settings change. Nevertheless, as discussed below, image data transformations can be used that map output of the second camera 110b to a canonical space for the first camera 110a, allowing a single EIS processing scheme to be used consistently for output of both cameras 110a, 110b.

The techniques discussed herein can be used effectively with two or more fixed focal length lenses. Optionally, the techniques discussed herein can also be used with one or more lenses that do provide optical zoom. For example, the techniques can be used to provide a seamless effective zoom over a range that includes image capture from (i) multiple cameras with different optical zoom ranges that may or may not intersect or overlap, or (ii) one or more cameras that provide optical zoom and one or more fixed-focal-length cameras.

Figure 2:
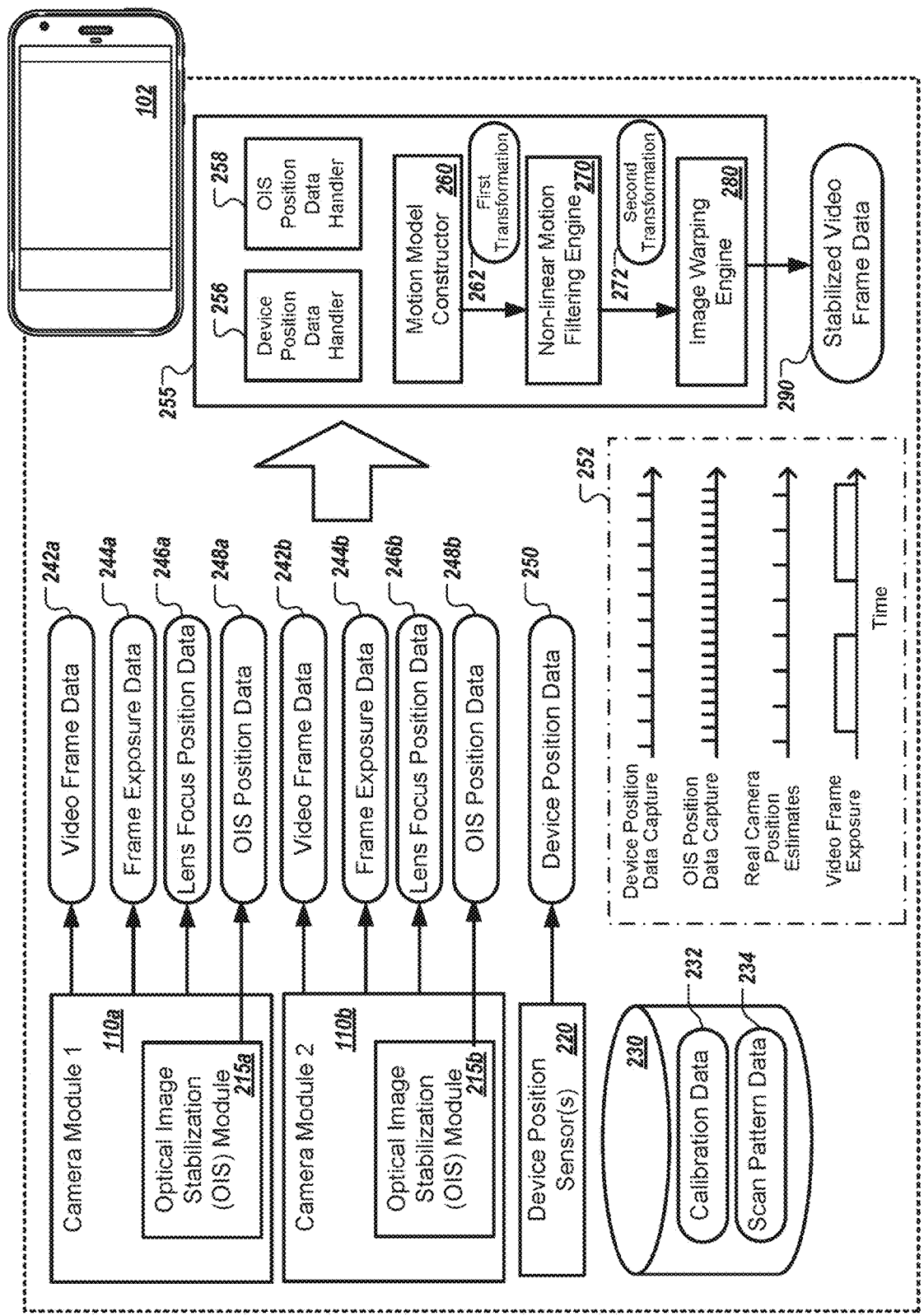
FIG. 2 is a block diagram illustrating an example of components of the device of FIGS. 1A-1B.

FIG. 2 is a diagram that illustrates an example of the device 102 that provides video stabilization. As discussed above, the device 102 includes a first camera 110a and a second camera 110b. One or more of the cameras 110a-110b may optionally include an OIS module 215a-215b. The device 102 may capture video frames while using the OIS module(s) 215a-215b, if included, to at least partially counteract movement of the device 102 during frame capture. The device 102 also includes one or more device position sensors 220, one or more data storage devices 230, and an EIS module 255.

The device 102 can be any of various types that include a camera module, such as a mobile phone, a tablet computer, a camera, etc. In some implementations, the device 102 can include a computing system for performing the operations of the EIS module 255, which may be carried out in software, hardware, or some combination thereof. For example, the device 102 may include various processing components, e.g., one or more processors, one or more data storage devices storing executable instructions, memory, input/output components, and so on. The processors that perform the EIS processing may include general purpose processors (e.g., the main CPU of a mobile phone or other device), a graphics processor, a co-processor, an image processor, a fixed-function EIS processor, or any combination thereof.

The EIS module 255 uses position data from both the device position sensors 220 and the OIS modules 215a-215b to stabilize the video captured by the recording device. For example, the position data from the OIS modules 215a-215b can be used to determine offsets, representing the effects of OIS movement, with respect to expected camera view that would be inferred from the device position data. This enables the EIS module 215 to estimate an effective camera position reflecting the actual view of the image sensor even as the OIS modules 215a-215b vary the camera's view of a scene relative to the device position. Along with other features discussed herein, these techniques can enable the device 102 to effectively use OIS and EIS processing concurrently and realize the benefits of both technologies.

In general, OIS can be very effective at reducing blur within individual frames due to camera shake, and OIS can be somewhat effective at reducing movement apparent over a series of frames. OIS used alone is often subject to various limitations, however. OIS modules may be limited in the speed that they respond to movement and in the magnitude of movement that can be compensated. In addition, the operation of OIS modules sometimes causes distortion such as wobbly video, and may incorrectly counteract desired movement such as panning. The EIS module 255 can lessen the impact of these limitations using the position data describing the internal movements of the OIS module.

Because the OIS modules 215a-215b attempt to compensate for movement of the recording device, device motion alone may not indicate the true camera view used during video capture. If EIS processing attempts to compensate for movement based on device motion alone, the EIS processing may attempt to correct for movement that was already compensated for by the OIS system. Further, OIS generally only partially removes the effects of device movements, and the amount of compensation can vary from one frame to the next. To provide high-quality stabilization, the EIS module 255 uses OIS position data alongside device-level position data to vary the amount of stabilization applied for each frame, and even for individual scanlines of frames in some implementations. This processing can provide effective stabilization as well as reduce or eliminate distortion in video footage. For example, changes in OIS lens shift position while capturing a frame may introduce distortion, especially when combined with rolling shutters that are typical of many camera modules. With information about the OIS lens shifts at different times during frame capture, the EIS module 255 can estimate the lens positions when different portions of the frame were captured and correct the image. The EIS module 255 can also compensate to reduce the impact of OIS lens shifts that interfere with panning or are otherwise undesired.

Another way that the EIS module 255 can enhance the video is through analysis of data for subsequently captured frames. To process a particular frame, the EIS processing module may assess a set of camera positions in a time window including times when one or more future frames were captured. The information regarding future frames and corresponding positions can be used in a number of ways. First, the EIS module 255 can apply filtering to the set of camera positions to smooth the motion pattern used to define image transforms for altering the frames. Second, the EIS module 255 can use the set of camera positions to evaluate a likelihood that consistent movement (e.g., panning) is present or is attempted and then adjust frames consistent with this motion when likely. Third, the EIS module 255 can evaluate the camera position for a frame with respect to future camera positions and adjust for large future movements. For example, if a large, rapid movement is identified for future frames, the EIS module 255 can begin adjusting the content of frames before the motion begins. Rather than allowing a large apparent motion over a few frames, the EIS module 255 can spread the motion over larger frames, so that incremental image shifts occur during earlier frames and gradually spread out the movement over a greater number of frames.

The EIS module 255 performs regional synthesis of the output frames, for example, varying the transforms applied to each scanline of an image frame. This allows the system to correct for rolling shutter distortion, movement of the OIS modules 215a-215b, and various device motions that occur within the capture duration for a single frame.

Referring still to FIG. 2, the device 102 can be any appropriate device having a camera to capture video data, e.g., a camera, a cellular phone, a smart phone, a tablet computer, a wearable computer, or other device. While the example of FIG. 2 illustrates a single device capturing video and processing the video, the functions may optionally be spread among multiple devices or systems. For example, a first device may capture video frames and also record position data and other parameters as metadata. The first device may provide the video frames and metadata to a second device, e.g., a local computing system or a remote server, which can perform EIS processing as discussed herein.

The first camera 110a, can include a lens element, an image sensor, sensor read circuitry, and other components. The OIS modules 215a-215b can include sensors, a movable element, a processor, and a drive mechanism to move the movable element. The movable element is located in the optical path of the first camera 110a. For example, the movable element may be a reflective or refractive element, for example, a lens, a mirror, a prism. In some implementations, the movable element is the image sensor of the first camera 110a. The sensors can include one or more gyroscopes or other sensors to detect movement. The processor determines an amount and direction of movement needed for the movable element to compensate for movement indicated by the sensors, then instructs the drive mechanism to move the movable element.

The device 102 includes one or more position sensors 220 that measure changes in the orientation of the device 102. In some implementations, the position sensors 220 for the device 102 are separate from the sensors used by the OIS modules 215a-215b. The position sensors 220 can detect rotation of the device 102 about one or more axes. As examples, the device position sensor 220 may be a 3-axis gyroscope or an inertial measurement unit (IMU). Other sensors may additionally or alternatively be used to determine device position. For example, one or more accelerometers, one-axis gyroscopes, two-axis gyroscopes, etc. may be used to determine a position of the device 102. Generally, any appropriate sensor or combination of sensors that allow a rotational position of the device 102 to be determined can be used.

In some instances, position data from gyroscope sensors of the OIS modules 215a-215b may be captured and stored in addition to or instead of using separate position sensors 220 of the recording device 220. Nevertheless, it can be beneficial for the device 102 to use gyroscope sensors that have different characteristics than OIS sensors. For example, gyroscope sensors in for the device 102 may provide measurements at a rate of about 400 Hz with sensible rotation range of greater than 100 degrees per second. Compared to device-level sensors, typical gyroscope sensors of OIS modules may provide measurements at a different rate and range, e.g., a rate of 5000 measurements per second or higher, with a sensible rotation range of about 10 degrees per second. In some implementations, having the greater sensible rotation range of device-level sensors is beneficial (e.g., to describe large movements), as is the more frequent measurements of OIS module sensors (e.g., to detect small changes or high-frequency patterns). Both types of data may thus be used together to determine positions of the device 102.

The device 102 includes one or more data storage devices 230 which store information characterizing the first camera 110a and the frame capture process. For example, the stored data can include calibration data 232 that indicates relationships between positions of the OIS modules 215a-215b and resulting offsets occurring in image data. Similarly, the calibration data 232 can indicate a correspondence of camera module lens focus positions and effective focal lengths for those focus positions (e.g., with different mappings for each camera 110a, 110b), allowing the system to account for focus breathing In addition, the calibration data 232 or other stored data can indicate a correspondence of camera lens focus positions and object distances, allowing translation from lens focus positions selected by an auto-focus system to object distances indicating the distance of the focused-on object from the camera's sensor plane. The calibration data 232 also indicates the relative 3D spatial position of one camera 110a with respect to the other camera 110b. Usually this involves calibration data that specifies a 3D rotation and 3D translation of one camera with respect to the other. Typically, calibration is done for each device manufactured, to guarantee the best user experience. As a result, the calibration data 232 can be highly accurate for the characteristics of the particular camera module (e.g., the cameras 110a, 110b, their mounting structures, etc.) and the state of the module after manufacturing. The stored data can include scan pattern data 234, which can indicate readout properties of the image sensor in the first camera 110a. For example, the scan pattern data 234 may indicate a direction of scanning (e.g., scanlines read from top to bottom), whether scanlines are read individually or in groups, and so on.

During video capture, the cameras 110a-110b, the OIS modules 215a-215b, and the device position sensor 220 may each provide information about the video capture process. The first camera 110a provides video frame data 242a, for example, a sequence of video image frames. The second camera 110b similarly provides video frame data 242b. The cameras 110a-110b also provide frame exposure data 244a-244b, which can include, for each frame captured, an indication of an exposure duration and a reference time indicating when the exposure occurred (e.g., a start time or end time for the exposure). The cameras 110a-110b also provide lens focus position data 246a-246b, which indicates a lens focus position for each captured frame.

The OIS modules 215a-215b provide OIS position data 248a-248b, which indicates the position of the movable element(s) of the OIS modules 215a-215b at various times during video capture. For example, when the movable element is a movable lens that shifts to compensate for motion, the OIS modules 215a-215b can provide a lens shift read out that specifies the current position of the movable lens in each. The device 102 can record the lens shift positions and times that the position occurred. In some implementations, the OIS position data 248a-248b is captured at a high frequency, for example at a rate that is higher than the frame rate of video capture, so that multiple measurements are made over the duration of each video frame exposure.

The device position sensors 220 provide device position data 250 that indicates rotation and/or other movement of the device 102 during video capture. The device position can be measured at a high frequency, for example, 200 Hz or higher. Thus, in many instances, measurements can be obtained for multiple different times during the capture of each video frame.

The lens focus position data 246, the OIS position data 248, and the device position data 250 can all be recorded with timestamps indicating times that the specified positions occurred. The timestamps can be made with precision, for example, to the nearest millisecond, so that the data obtained from the various position measurements can be aligned in time. In addition, positions of a device, OIS system, or lens focus mechanism can be interpolated to determine values at times between measurements.

An example of potential timing of data capture is shown in chart 252. As illustrated, device position data 250 (e.g., gyroscope data) and OIS position data 248 (e.g., lens shift position data) may be captured at rates higher than the video capture frame rate (e.g., 30 frames per second, 60 frames per second, etc.), so that multiple positions of the device and of the OIS system can be determined for each video frame. As a result, for each scanline, which may be horizontal or vertical depending on the shuttering direction, a different device position and OIS settings can be used to determine the transformations of that scanline. Lens focus position data 246 may be captured at least once per image frame. The position data may be captured asynchronously relative to frame exposure, for example, with gyroscope sensor data and OIS position data being sampled at a rate that exceeds and is not necessarily synchronized with the beginning or end of image frame exposures.

The data obtained from the cameras 110a-110b and other components is provided to the EIS module 255 for processing. This processing may occur while video capture is ongoing. For example, EIS processing can be performed in substantially real time, so that the video file that is made accessible to the user at the end of video capture has been stabilized by the EIS module 255. In some implementations, EIS processing may be performed at a later time, for example after video capture has completed, or by a device other than the one that recorded the video. The EIS module 255 can be implemented in hardware, firmware, software, or a combination or sub-combination of them.

FIG. 2 illustrates only a portion of the functionality of the EIS module 255. The example in FIG. 2 illustrates EIS processing for video frames that involve frames captured from a single one of the cameras 110a-110b, and does not describe the features used to provide digital zoom or adjust EIS processing for the zoom level. As described below, however, the device 102 can use image data captured from both cameras to provide digital zoom during video capture and recording. For example, once a user zooms in to a threshold zoom amount, the device 102 can switch from using images captured from the first camera 110a to using images captured from the second camera 110b. In addition, the zoom level can adjust the transformations and other operations of the EIS module 225, e.g., to apply a greater level of stabilization as the zoom level increases, since zooming in can accentuate the apparent shake in the video. The adjustment of the EIS processing to account for digital zoom and transitions between cameras is discussed with respect to FIGS. 4-6 In some implementations, the transformations can be achieved by applying different transformations for each line of a captured image. For each line of the image, the device 102 can compute a specific timestamp for that line, so that this line is associated with the corresponding OIS and device position data.

Referring still to FIG. 2, the EIS module 255 includes a device position data handler 256 that periodically or continuously obtains updated device position data 250 from the device position sensor(s) 220. The motion data handler estimates the current camera pose from the device position data 250. For example, a gyroscope signal can be obtained and used to estimate a device position of the device 102 at a high frequency, for example, 200 Hz. This device position at a given time, t, is referred to below as R(t). This device position may indicate a rotational position of the device 102 with respect to, for example, one, two, or three axes. The device position may be expressed as a rotation matrix, or with respect to a coordinate system, or in other forms. Each calculated device position can be labeled with a time indicating the time when that position of the device 102 occurred.

The EIS module 255 includes an OIS position data handler 258, which periodically or continuously obtains the OIS position readout illustrated as OIS position data 248. The OIS position data handler 258 converts the OIS readout values into offsets that can be used with the device positions. For example, an OIS lens position can be converted to a two-dimensional pixel offset. To generate the offset, the OIS position data handler 258 can use the stored calibration data 232, which may provide conversion coefficients or matrices to translate from an OIS position to the corresponding offset. Generating the offset due to the OIS position can take into account changes in effective focal length of the camera over time, e.g., due to changes in lens focus position and/or lens zoom position if the first camera 110a is capable of optical zoom. Like the motion data handler 256, the OIS position data handler 258 labels each measurement and offset with the time that the data represents.

The EIS module includes a motion model constructor 260 that receives the device positions calculated by the device position data handler 256 and the OIS offsets calculated by the OIS position data handler 258. With this data and the frame exposure data 244 and the lens focus position data 246, the motion model constructor 260 generates a first transformation 262 for a frame. For example, the first transformation 262 can be a projection matrix that maps the real-world scene in view of the camera to the captured frame. This process is repeated for each frame. When generating the first transformation 262 for a frame, the positions of the OIS modules 215a-215b can be modeled as offsets from the principal device positions determined from gyroscope data. As discussed further below, the offsets can take into account an effective focal length of the camera at the time of capture, by looking up the effective focal length for the lens focus position at the time. The first transformation 262 can separately describe the relationships of different subsets or regions of a single image frame. For example, different portions or components of the first transformation 262 may describe how different scanlines of a frame are mapped to the real-world scene. Device positions, OIS module positions, object distances (e.g., distance of an object focused on from the camera), and lens focus positions can all be aligned using measurement timestamps, and interpolated as needed, to provide accurate positions at the time of exposure for individual scanlines of a frame. For a lens with auto-focusing, the focus position is set depending on how far the object is from the camera. Accordingly, there is a map indicating relationships between the lens focus position and object distance. The mapping can be generated and calibrated, and the object distance is used in the later computation for the spatial transition.

The first transformation 262 generated by the motion model constructor 260 is provided to a non-linear motion filtering engine 270 which determines a second transformation 272. This second transformation 272 can be a second projection matrix P'i,j that projects image data for a frame to an output frame that represents a stabilized version of the frame. Specifically, the second transformation 272 can map the image projection made using the first transformation 262, Pi,j, to the output frame rather than operating on the image data as captured. In some implementations, the two transformations 262, 272 can then be combined into a single transformation that operates on initially captured image data of a frame and directly maps it to a stabilized output frame.

To effectively stabilize movement, the non-linear motion filtering engine 270 can generate the second transformation 272 to take into account movement that will occur in the future, after the capture of the frame being processed. For example, for a current frame under analysis, the position of the recording device may not have moved significantly since the previous frame. Nevertheless, if the engine 270 determines that significant motion occurs in future frames, the second transformation 272 can be generated to shift or otherwise alter the current frame to introduce apparent movement in the video, so that large future movement can be spread out as a series of gradual changes rather than an abrupt change. Similarly, if stabilization of future frames introduces cropping or other changes, the second transformation 272 can be generated to at least partially propagate those changes to earlier frames for more gradual and consistent change over the series of frames.

The non-linear filtering engine 270 can generate the second transformation 272 from a virtual camera position for a frame. Rather than representing the actual position of the camera when exposure occurred, the virtual camera position can represent an adjusted or hypothetical pose of the device 102 that would stabilize the video being recorded. A virtual position can represent a desired position to place a virtual camera, e.g., a position that would simulate a particular view or perspective of a scene. In general, any camera position can be represented by its rotation and translation with respect to a global reference frame. The virtual camera position can be expressed as a rotation matrix, e.g., a matrix indicating rotational offsets relative to a reference position. This may be a 3×3 matrix that indicates rotational offsets with respect to 3 rotational axes. In some implementations, the stabilization processing of the EIS module defines positions only in terms of the rotational components, since these generally have the greatest impact on stability of handheld videos.

The virtual camera position for a frame can reflect adjustments to the estimated camera positions to enhance video stabilization, correct for distortion and operations, facilitate panning, and otherwise enhance the video. The virtual camera position for a frame can be determined by generating an initial camera position that is adjusted based on a variety of factors. For example, the virtual camera position can be adjusted through filtering of device positions based on movement detected before and after a frame, based on an amount of blur in the frame, based on a likelihood that panning is occurring, through adjustments to prepare for motion in future frames, and/or to ensure that image data covers an entire output frame. The various factors can be accounted for by generating a series of virtual camera positions for a frame that are altered, blended, or otherwise used to determine a final virtual camera position for the frame.

Just as the transformations 262, 272 can have different mappings for different scanlines, different virtual camera positions can be determined for different scanlines of a frame, to adjust for changes in device position, OIS modules 215a-215b position, and/or lens focus position during frame capture. Thus, different virtual camera positions can be used for different parts of a frame. For efficiency, virtual camera positions and corresponding components of the second transformation 272 can be calculated for a proper subset of the scanlines of an image sensor, then the appropriate data can be interpolated for the remaining scanlines. In various examples below, a single scanline, such as the center scanline of the image sensor, is discussed for simplicity. The techniques for fully computing virtual camera positions and corresponding projection matrix components can be used for multiple scanlines of an image frame, and even for each scanline individually if desired.

As used herein, a device position refers to a position of the device 102, e.g., as indicated by the device position data 250 (e.g., gyroscope data) and the output of the device position data handler 256. This device-level position indicates the pose or orientation of the device 102 without taking into account internal movement of the lenses of the first camera 110a or the movement of the OIS modules 215a-215b. Also as used herein, a camera position indicates a position corresponding to an effective or estimated view of the camera. By taking into account shifts due to operation of the OIS modules 215a-215b, lens breathing, and other factors, the camera position may be different from the device position. Further, camera positions may be virtual positions, e.g., approximations or hypothetical positions that reflect an enhanced or altered view of the camera rather than an actual view of the camera.

The EIS module 255 then uses an image warping engine 280 to use the output of the non-linear motion filtering engine 270 and map each captured image frame to an output frame. The second projection 272 can include components corresponding to each scanline of a frame, so that each part of the frame is mapped to the output space and each of the pixels of the output frame are defined. The processing of the EIS module 255 can be performed for each of the frames of the video.

Figure 3:
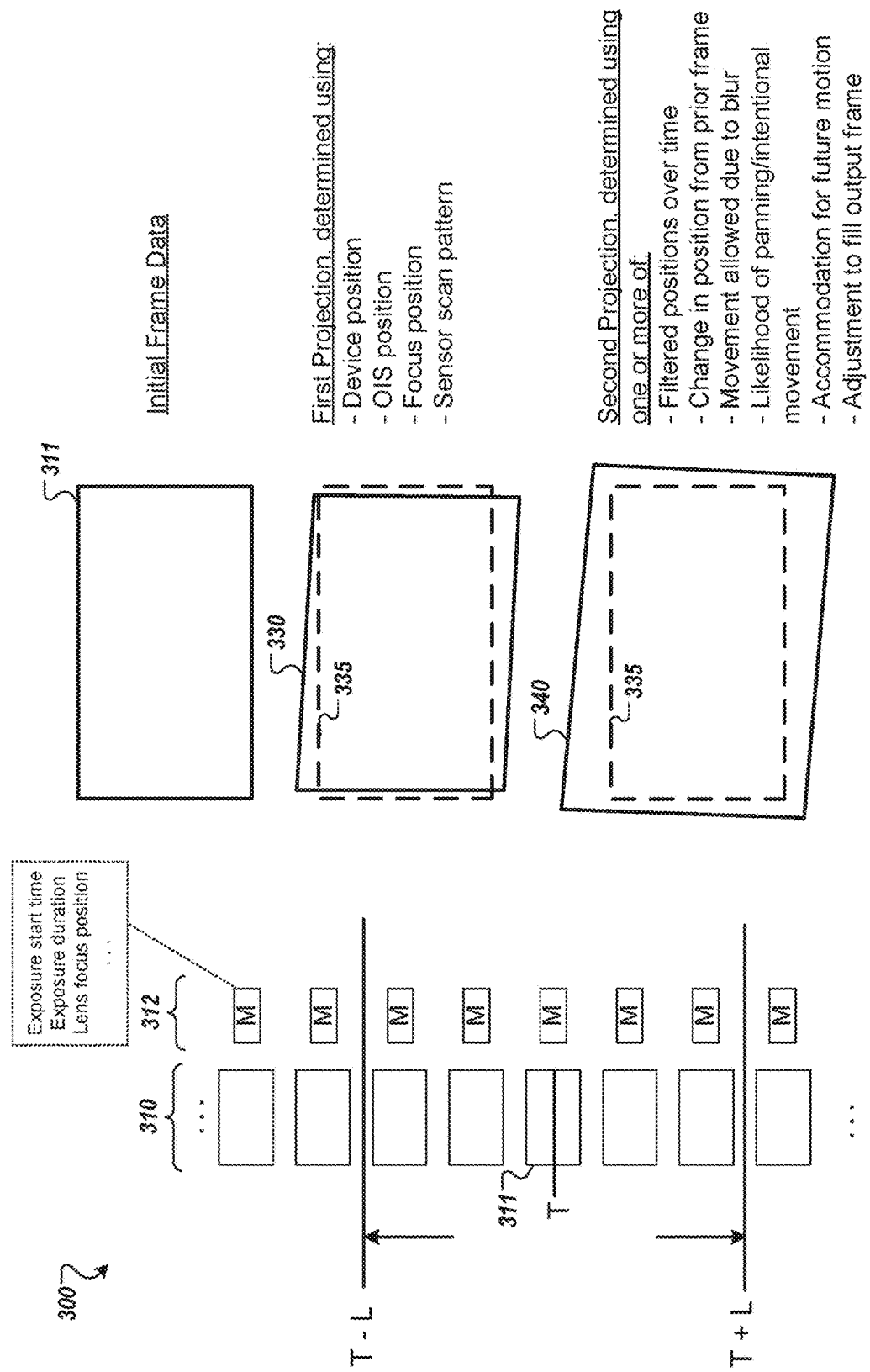
FIG. 3 is a diagram illustrating example techniques for video stabilization.

FIG. 3 is a diagram that illustrates an example of data used for video stabilization. The diagram shows a series of frames 310 that are captured by the device 102. Each frame is labeled with a corresponding set of metadata 312 that indicates, for example, exposure duration, an exposure reference time (e.g., a start time, a stop time, or other reference point for the exposure), a lens focus position, and so on. Although not illustrated, device position data and OIS module position data is captured at various times during each exposure and timestamped.

To perform stabilizing processing for a frame 311, a range of time around the capture of the frame 311 is defined. This range of time or window of frames is analyzed to determine how to transform the frame 311. As used herein, the time "t" for a frame generally refers to the time of capture of the center scanline, which is used to represent the reference time of capture for the frame. When referring to a time of an individual scanline (e.g., to consider a time that may be different from the main time of capture for the center scanline of the frame), the time is denoted with $t_L$, where L is an index or identifier for the specific scanline. The time of exposure, t, of the center scanline of the frame 311 under analysis can be used as the center of the range of time used for analysis. A predetermined time offset, Q, can be used to set the range, e.g., a time range from [t−Q, t+Q]. In some implementations, this time offset, Q, is approximately 200 ms. As a result, the range would include about 7 frames before and about 7 frames after the frame 311. Larger and smaller time offsets, Q, may be used. Because the EIS module 255 uses the context of future frames during processing, processing of a frame is delayed until the appropriate number of subsequent frames have been captured.

In FIG. 3, the frame 311 is shown as captured by an image sensor (e.g., of either camera 110a-110b). As discussed above, the EIS module 255 defines a first transformation 262 from data indicating the real positions of the device 102 during capture of the frame 311, as well as positions of camera elements such as the OIS module elements and lens focus position. The result of applying the first transformation 262 is a projected image 330, shown with respect to an output frame target 335. In some implementations, the first transformation 262 is determined using only the data corresponding to the capture of the frame 311. The transformation 262 corresponds to the real lens position of the camera, and so the projected image 330 estimates a mapping between the image data and the actual scene in view of the camera.

The EIS module 255 uses a second transformation 272 to adjust the image data of the frame 311 further. This second transformation 272 corresponds to a virtual lens position, e.g., a hypothetical position that would have resulted in more stable video if used to capture the frame 311. This second transformation 272, when applied to the frame 311, produces the projected image 340 which fully defines the data for the output frame 335.

The second transformation 272 that produces the projected image 340 may be generated from data corresponding to each of the frames in the time range from [t−Q, t+Q]. The positions R(t) of the device 102 over this time period can be filtered to smooth motion over the range, for example, using a Gaussian filter. The set of positions R(t) referred to here is the set including the position of the device 102 at each of the center scanline capture times that occur in the range [t−Q, t+Q]. Consider an example in which the range encompasses the center scanline capture time for a current frame being processed, to, and the center scanline capture times for seven frames before and after the current frame being processed. The set of positions that is filtered would be the set $\{R(t_{-7}), R(t_{-6}), \ldots, R(t_{-1}), R(t_0), R(t_1), \ldots, R(t_6), R(t_{-7})\}$. The result of filtering at time t, the exposure of the center scanline of the frame 311, can be used as an initial virtual camera position, $V_0(t)$. Even with filtering, there may be undesirable movement in the device positions or other factors that result in undesired motion. As a result the initial virtual camera position, $V_0(t)$, can be updated through a series of further operations. In some implementations, the positions R(t) that are filtered are positions that assume no OIS movement, thus the positions can be based on device position data 250 without taking into account OIS position data 248. In other implementations, OIS motion and offsets can be factored into the set of positions that are filtered to generate the initial virtual camera position, $V_0(t)$.

For example, a second virtual camera position, $V_1(t)$ can be generated by interpolating the position $V_0(t)$ with a final camera position $V_F(t_{pre})$ for the previous frame based on an amount of motion occurring over future frames. The final camera position $V_F(t_{pre})$ can be the virtual camera position (e.g., used for generating the recorded output frame) for the center scanline of the frame captured immediately before the frame 311. The camera position for the previous frame can be a final virtual camera position, e.g., the position corresponding to the transformations used to generate the stabilized output version of the previous frame. The interpolation can align the apparent change of motion between the frame 311 and the previous frame, with the apparent change in motion between the frame 311 and future frames.

A third virtual camera position, $V_2(t)$, can be generated by interpolating $V_1(t)$ with the real device position R(t) based on an amount of camera motion blur present in the frame 311. This can reduce the amount of stabilization applied to reduce a viewer's perception of the blur. Since motion blur generally cannot be removed, this can decrease the stability of the video when appropriate, in order to produce a more natural result.

A fourth virtual camera position, $V_3(t)$, can be generated to simulate or represent a position occurring during consistent motion of the device 102 over the time range [t−Q, t+Q]. This position may be determined by applying a stable filter, such as a domain transform filter, to the estimated actual device positions, R(t), over the time range. Although the filter is applied to the same set of device positions used to generate $V_0(t)$, this step represents filtering of a different type. For example, $V_0(t)$ may be generated through filtering that smooths but generally follows the changes in estimated actual device positions over time, without imposing a predetermined shape or pattern. By contrast, $V_3(t)$ is generated by filtering the device patterns to conform to a predetermined, consistent motion pattern, such as substantially linear panning or other movement that may be potentially intended by a user of the device 102.

A fifth virtual camera position, $V_4(t)$, can be generated as an interpolation of $V_3(t)$ and $V_2(t)$. The EIS module 255 can assess whether the changes in device position over time likely represent panning of the device 102, and can weight or adjust the interpolation accordingly. If a high likelihood of panning is determined, then $V_4(t)$ is close to the estimated panning position $V_3(t)$. If the likelihood of panning is determined to be low, then $V_4(t)$ will be closer to position $V_2(t)$.

With the fifth virtual camera position, $V_4(t)$, the EIS module 255 can assess the coverage that a corresponding transformation would provide to the output frame 335. Since it is desired to fill the entire output frame 335 and not leave any pixels undefined, the EIS module 255 can determine a transformation such as a projection matrix, representing a view of the scene from the virtual camera position $V_4(t)$, and verify that the projected image would cover the output frame 335. To account for motion in future frames, the transformation can be applied to the portion of the scene captured by the future image frames. The transformation and the corresponding virtual camera position $V_4(t)$ can be adjusted so that the current frame and each of a set of future frames would all fully define the output frame 335 when mapped using the transformation. The resulting transformation may be set as the transformation 272 and can be used to generate the stabilized output frame 335 for the frame 311.

In some implementations, generating the stabilized output frame 335 for the frame 311 includes performing the EIS processing techniques discussed for the scanline L exposed at time $t_L$ for one or more other scanlines of the frame 311. For example, the processing may be performed for scanlines at certain intervals (e.g., every 100 scanlines, every 500 scanlines, etc.) or at certain reference points (e.g., one quarter and three quarters across the frame, or at the top of the frame and bottom of the frame). When the virtual camera positions and second transformation 272 are determined for only a proper subset of the scanlines of the frame 311, the transformations (e.g., corresponding portions of a projection matrix) for the scanlines are interpolated between the calculated positions. In this manner, an appropriate transformation is determined for each scanline, and each scanline may have a different transformation applied as a result. In some implementations, the full processing of generating virtual camera positions and a second transformation 272 may be done for each scanline of each frame, without relying on interpolation between data for different scanlines.

Once the frame 311 is mapped to the output frame 335, the result is saved and the EIS module 255 begins processing the next frame. The process continues until each of the frames of the video have been processed.

The various factors used to generate the virtual camera positions and resulting transformation can be used in combination or separately. For example, depending on the implementation, some of the interpolations and adjustments used to create virtual camera positions $V_0(t)$ to $V_4(t)$ may be omitted. For example, in different implementations, any of the filtered camera positions $V_0(t)$ to $V_3(t)$ may be used to determine a transformation to project data to an output frame, instead of using $V_4(t)$ for that purpose. Accordingly, using any of the filtered camera positions $V_0(t)$, $V_1(t)$, and $V_2(t)$ to generate a stabilizing transformation may still improve stability of video. Similarly $V_3(t)$ may be effective to stabilize video where panning is occurring. Many other variations are within the scope of the disclosure, even if taking into account a subset of the different factors discussed.

The techniques discussed can be applied in various ways. For example, rather than apply the two transformations 262, 272 sequentially to image data, the recording device can generate a single combined transformation that reflects the combined effects of both. Thus, generating stabilized image data using the transformations 262, 272 may encompass the generation of further transformations or relationships that are ultimately used to stabilize the image data, rather than applying the transformations 262, 272 directly. Various techniques for image stabilization are described and other techniques can be additionally or alternatively used, such as the techniques discussed in U.S. Pat. No. 10,462,370, issued on Oct. 29, 2019, which is incorporated herein by reference.

Figure 4:
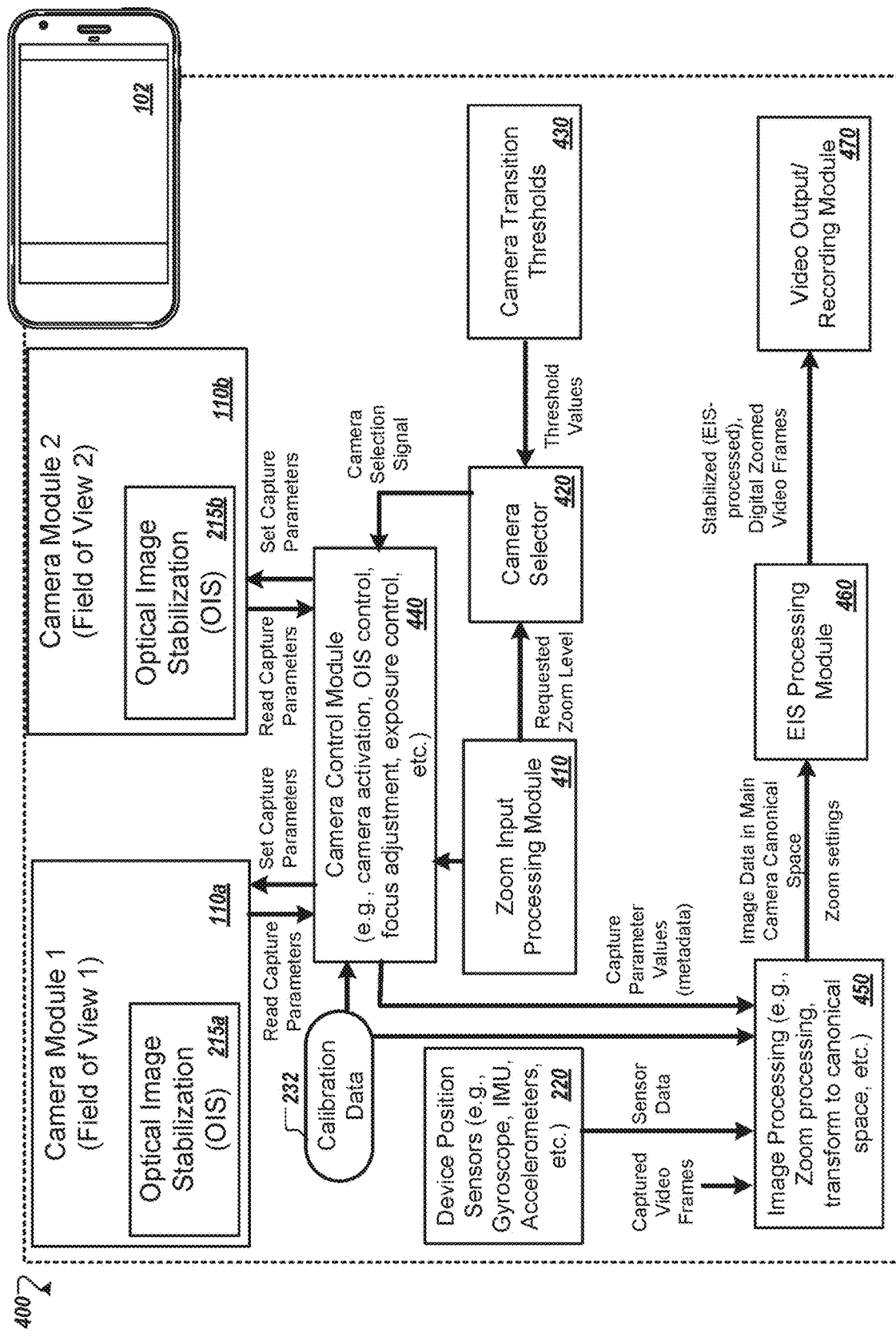
FIG. 4 is a block diagram indicating additional examples of processing by the device of FIGS. 1A-1B.

FIG. 4 is a block diagram indicating additional examples of processing by the device 102 of FIGS. 1A-1B. In addition to the elements shown in FIG. 2, some of which are represented again in FIG. 4, the device 102 can include hardware and/or software elements to provide additional functions represented in FIG. 4.

The device 102 can include a zoom input processing module 410 to process user input to the device 102 that indicates a requested change in zoom level. As the device 102 captures video, even with EIS engaged, the device 102 can receive user input to change the zoom level. This can include input to move an on-screen slider control, a gesture on a touchscreen, or other input. A zoom level of 1.0× can represent the widest field of view available using the camera 110a with EIS engaged. This may be a cropped section of the native image sensor resolution to provide a margin for EIS processing. The module 410 can determine the desired level of zoom based on the user input, for example, to move from a current zoom level (e.g., 1.0×) to a changed or desired zoom level (e.g., 2.0×).

Data indicating the requested zoom level is provided to a camera selector module 420, which determines whether to switch the camera used for video recording. For example, the camera selector module 420 can receive and use stored camera transition thresholds 430 that indicate the zoom levels where transitions between cameras should occur. For example, the second camera 110b can have a field of view that corresponds to a zoom level of 1.7×, and the transition threshold can be set at a zoom level of 1.8×. The camera selector 420 determines that the desired zoom level of 2.0 satisfies the 1.8× threshold (e.g., is greater than or equal to the threshold) and so a change in camera is appropriate from capture representing a zoom level of 1.8× onward. There may be multiple thresholds defined, such as a first threshold for zooming in (e.g., narrowing the field of view) and a second threshold for zooming out (e.g., expanding the field of view). These thresholds can be different. For example, the first threshold can be 1.8 and the second threshold can be 1.7, so that the transition point is different depending on whether the user is zooming in or zooming out.

In some implementations, the switch between the cameras 110a, 110b is controlled by more than simply a threshold. Consider a situation when the device is recording video using the camera 110b, and the user initiates zooming out to a level that will cause a switch to use the wider camera 110a instead. Assume the threshold for switching from the camera 110a to the camera 110b when zooming in is set at 1.8×, and the lowest zoom position the camera 110b can be used is 1.7× (e.g., the zoom level representing the full maximum field of view of the current camera 110b). As a result, when zooming out, the transition must be made by zoom level 1.7×, because the second camera 110*b* cannot provide a wider field of view than that. To address this situation, when the zoom level is reduced to 1.9×, the camera 110*a* will start to stream image data, even though the output frame is still based on the current image data output by camera 110*b*. This provides a period, e.g., during the zoom level transition from 1.9× to 1.8×, in which both cameras 110*a*, 110*b* are capturing and streaming image data of the scene. This provides an adjustment period for initializing capture with the camera 110*a*, so the camera 110*a* can "warm-up" and the autofocusing, auto-exposure, and other processes will start to converge. This adjustment period may provide a margin for the settings of the camera 110*a* to have its settings and capture initialized and aligned to match those currently used by the camera 110*a* before the switch.

In this manner, the device 102 can anticipate and prepare for the need for a switch between cameras based on factors such as the current zoom level, the direction of zoom change, and user interaction with the device 102. Upon detecting that a camera switch is likely to be needed, e.g., based on user input instructing zoom to decrease to 1.9×, the device 102 can instruct settings that begin capture with the next camera 110*a* to be used, before the user instructs a zoom level where a transition is targeted or when it becomes necessary. For example, if the device 102 begins video capture and settings adjustment when a zoom level of 1.9× is instructed by the user, and the camera 110*a* is ready and operating with the desired settings by the time the user instructs a zoom level 1.8×, then the device 102 can make the camera switch once the zoom level of 1.8× is instructed. Nevertheless, if for any reason the convergence or implementation of settings is not complete by the time the zoom level of 1.7× is instructed (e.g., the maximum field of view of the current camera 110*b*), the device 102 will force a switch when the zoom level reaches 1.7×.

The camera selector 420 provides a camera selection signal or other control data to a camera control module 440. The camera control module 440 reads video capture parameters from the cameras 110*a*, 110*b* and also sends instructions or settings to set video capture parameters. The video capture parameters can include, for example, which camera 110*a*, 110*b* is capturing image data, the rate of frame capture (e.g., 24 frames per second (fps), 30 fps, 60 fps, etc.), exposure settings, image sensor sensitivity, gain (e.g., applied before or after image capture), image capture time (e.g., the effective "shutter speed" or duration each scanline captures light during a frame), lens aperture size, object distance (e.g., distance of an object focused on from the camera), lens focus position or focus distance, OIS status (e.g., whether OIS is enabled or not, a mode of OIS used, etc.), OIS lens position (e.g., horizontal and vertical offsets, rotational position, etc.) a strength or level of OIS applied, and so on. The camera control module 440 can set these and other video capture parameters for general video capture, e.g., exposure, frame rate, etc. The camera control module 232 can also receive or access the calibration data 232. A calibration procedure can be done for each device, e.g., for device 102, as part of the manufacturing and quality assurance of the device. The calibration data can indicate, for example, data to fine-tune the relationships of the cameras 110*a*, 110*b* relative to each other, the relationships between lens focus positions and object distance (e.g., distance of the focal plane) for different lens positions, and so on.

The camera control module 440 can also enable and disable the cameras 110*a*, 110*b* at the appropriate times to cause the camera switch indicated by the camera selector 420 to occur. For example, when input indicates a change in zoom level from 1.0× to 2.0×, and data from the camera selector 420 indicates a change to the second camera 110*b* starting at 1.8×, the camera control module 440 can generate the control instructions to cause this transition to occur. Using stored information about the requested speed of zooming and any limits on the speed at which zooming can be performed consistently, the camera control module 440 determines a time to make the switch, e.g., a time that the incremental or gradual zoom reflected in image output will reach the 1.8× camera transition point. This time for transition can be based on a duration of time or number of frames to continue capturing data with the first camera 110*a* until the digital zoom can smoothly reach the 1.8× zoom level, or a time that the user input specifies that the 1.8× zoom level is reached.

In anticipation of the camera transition, the camera control module 440 can read video capture parameters from the current camera (e.g., the first camera 110*a*) and set corresponding video capture parameters for the camera to be used after the transition (e.g., the second camera 110*b*). This can include setting the same frame rate, same exposure level, same lens aperture, same focus distance, same OIS mode or status (e.g., whether enabled or not), and so on. In general, before a transition between cameras, there is a period of time in which both cameras 110*a*, 110*b* are actively capturing video data concurrently. For example, for the case of switching from the first camera 110*a* to the second camera 110*b*, before the zoom level reaches the threshold for switching to use the output of the camera 110*b* for the recorded video, the camera, 110*b* will open and begin video capture. The initial values for settings will be based on the values of settings that are currently used for the camera 110*a*. The camera 110*b* will start to adjust its operation toward the instructed settings, e.g., to converge to the mode of operation desired (e.g., appropriate aperture setting, correct focus distance setting, the correct OIS setting, etc.). This process may include the camera 110*b* or the device 102 determining the appropriate settings, such as with an auto-focus process to determine the correct focus distance. After the convergence or computation of settings is done for the camera 110*b*, the video stream that is used in the recording will be switched to be the video stream output by the camera 110*b*. In some cases, the parameters of the cameras 110*a*, 110*b* may not be the same, but the parameters for the camera 110*b* may nevertheless be set based on the parameters for capture being used by the camera 110*a* and may be set to promote or preserve consistency between the outputs. For example, the cameras 110*a*, 110*b* may not have the same aperture ranges available, so the camera control module 440 may set equivalent or approximately equivalent exposure levels for the two cameras 110*a*, 110*b*, but may do so with different combinations of settings for sensitivity/gain, capture time (e.g., shutter speed), and aperture. The camera control module 440 can activate the camera to be transitioned to, with the appropriate settings applied, in advance of the transition to using that camera for recorded final output frames, so that the image capture and an incoming video feed is available at or before the time of the transition.

Video data is processed using an image processing module 450. This module 450 can receive captured video frames streamed from the camera 110*a*, 110*b* that is currently selected for video capture. The module 450 also receives sensor data from device position sensors, such as gyroscope(s), inertial measurement unit(s) (IMUs), accelerometers, etc. The module 450 also receives video capture parameter values (e.g., from the camera control module or from memory) indicating the parameters used to capture the video frames. This can include metadata indicating OIS element positions, camera focus positions, object distances, frame capture times, shutter speed/capture durations, and so on for each frame and even for different portions of frames, even for specific scanlines or points in time within the process of capturing or reading a frame (see FIG. 2, chart 252). The module 450 also receives data indicating the digital zoom levels (e.g., which may be expressed as a magnification level, an equivalent lens focal length, a resulting field of view, a level of cropping, etc.). The image processing module 450 applies transformations to the captured image frames to remove artifacts due to rolling shutter, OIS system movements, focus breathing, and so on. For example, the module 450 can obtain a video frame and transform or project it to a canonical space for the camera that captured the frame, where in the canonical space time-varying aspects of capture of the frame (e.g., movement of the OIS elements, rolling shutter, etc.) are removed.

The module 450 can transform the image frame to the canonical camera space for the first camera 110*a*, regardless of whether the frame was captured with the first camera 110*a* or second camera 110*b*. For example, for images captured using the second camera 110*b*, the module 450 transforms data from a canonical space for the second camera 110*b* to a canonical space for the first camera 110*a*, by correcting for spatial differences between the positions of the cameras 110*a*, 110*b* on the device and other factors such as the focused position of the camera 110*b*. This can align the image data captured using the second camera 110*b* to the portion of the first camera's field of view, so that the view of the scene is consistent across the recorded video from both cameras 110*a*, 110*b*. This technique is discussed further with respect to FIGS. 5A-5C and 6 below.

The device 102 can include an EIS processing module 460 that receives and processes the image data transformed to the main camera's canonical space. The "main camera" refers to one of the multiple cameras that is designated in advance to serve as a reference for the other cameras. For example, the main camera can be the first camera 110*a*, which has the widest field of view, and the outputs of any other cameras (e.g., the second camera 110*b*) can be transformed or mapped to the canonical space for the first camera 110*a*. The module 450 maps image data for both cameras 110*a*, 110*b* to a common, standardized canonical space that has compensated for time-dependent variation within the frame (e.g., differences in time of capture, device position, OIS position, etc. of different scanlines of the frame). This simplifies the EIS processing significantly by eliminating the need for the EIS processing module 460 to account for time-varying capture properties within the frame. It also allows a single EIS processing workflow to be used for video data captured using either camera 110*a*, 110*b*. The EIS processing module 460 also receives the zoom settings, e.g., zoom level or field of view, that are desired, potentially for each frame. This enables the EIS processing module to apply an appropriate amount of stabilization for each frame according to the level of zoom used for the frame. As the zoom level increases and the image is magnified, the impact of movement of the camera is also magnified. Accordingly, the EIS processing module 460 can apply stronger stabilization as zoom level increases to maintain a generally consistent level of stability in the output video. The EIS processing module can use any or all of the EIS processing techniques discussed above with respect to FIGS. 2 and 3. The stabilization can be considered to project the image data from the main camera's canonical image space to virtual camera space, where the image data is transformed to simulate the output as if the camera had a smoother trajectory of movement than the real camera had during video capture.

After the EIS processing module 460 stabilizes the image data for a frame, the image data for the frame is output and/or recorded on a data storage device (e.g., a non-volatile storage medium such as flash memory). The zoom level that the modules 410, 440 determine for the frame can be used to crop, upscale, or otherwise apply the digital zoom level needed for the frame. As a result of these techniques, the device 102 can seamlessly transition between the two cameras 110*a*, 110*b* during capture, with the transition being automatically managed by the device 102 based on the zoom level set by the user. The resulting video file can thus include video segments captured using different cameras 110*a*, 110*b* interspersed through the video file, with the data being aligned and transformed to show smooth zoom transitions and while maintaining consistent EIS processing over the segments from both cameras 110*a*, 110*b*.

The device 102 can include a video output and/or recording module 470. The video output and/or recording module 470 may be configured to receive the output of the EIS processing module 460 and to provide this for storage as a video file locally at the device and/or remotely. In addition or alternatively, the video output and/or recording module 470 may stream the output for display locally on the device 102 and/or remotely at another display device, e.g. via a network.

Figure 5A:
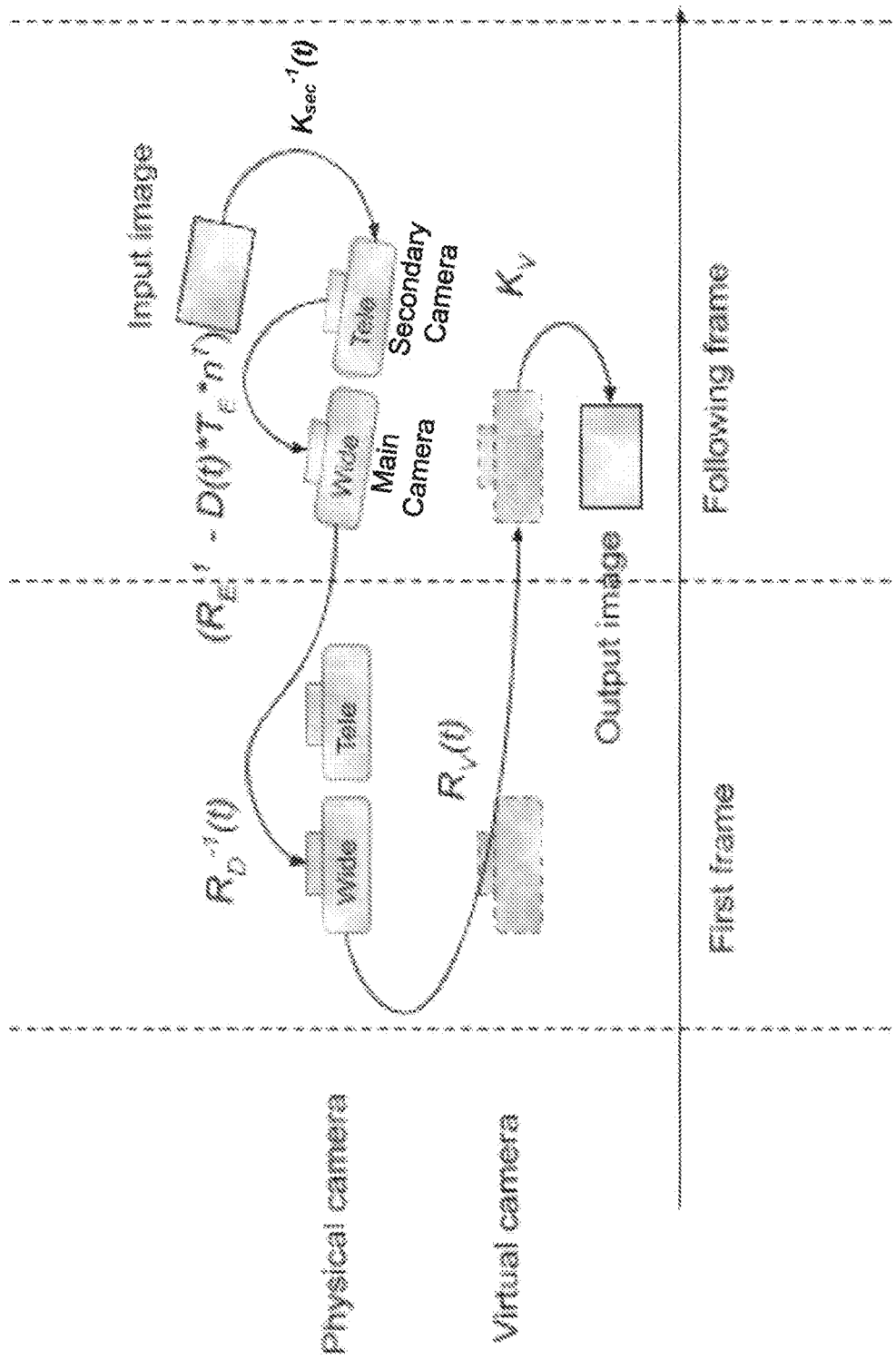
FIGS. 5A-5C are diagrams illustrating examples of techniques for multi-camera video stabilization.
Figure 5B:
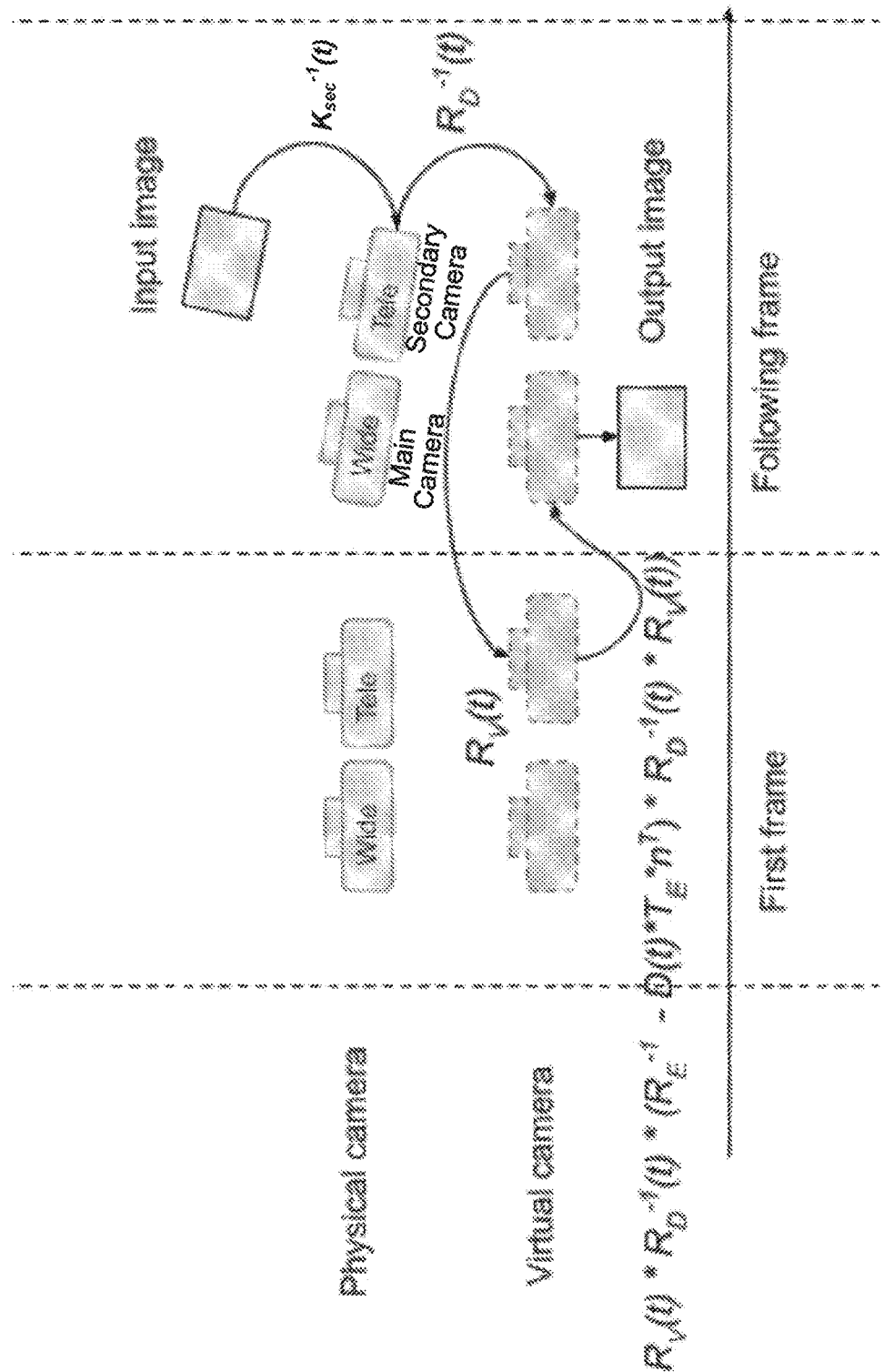
Figure 5C:
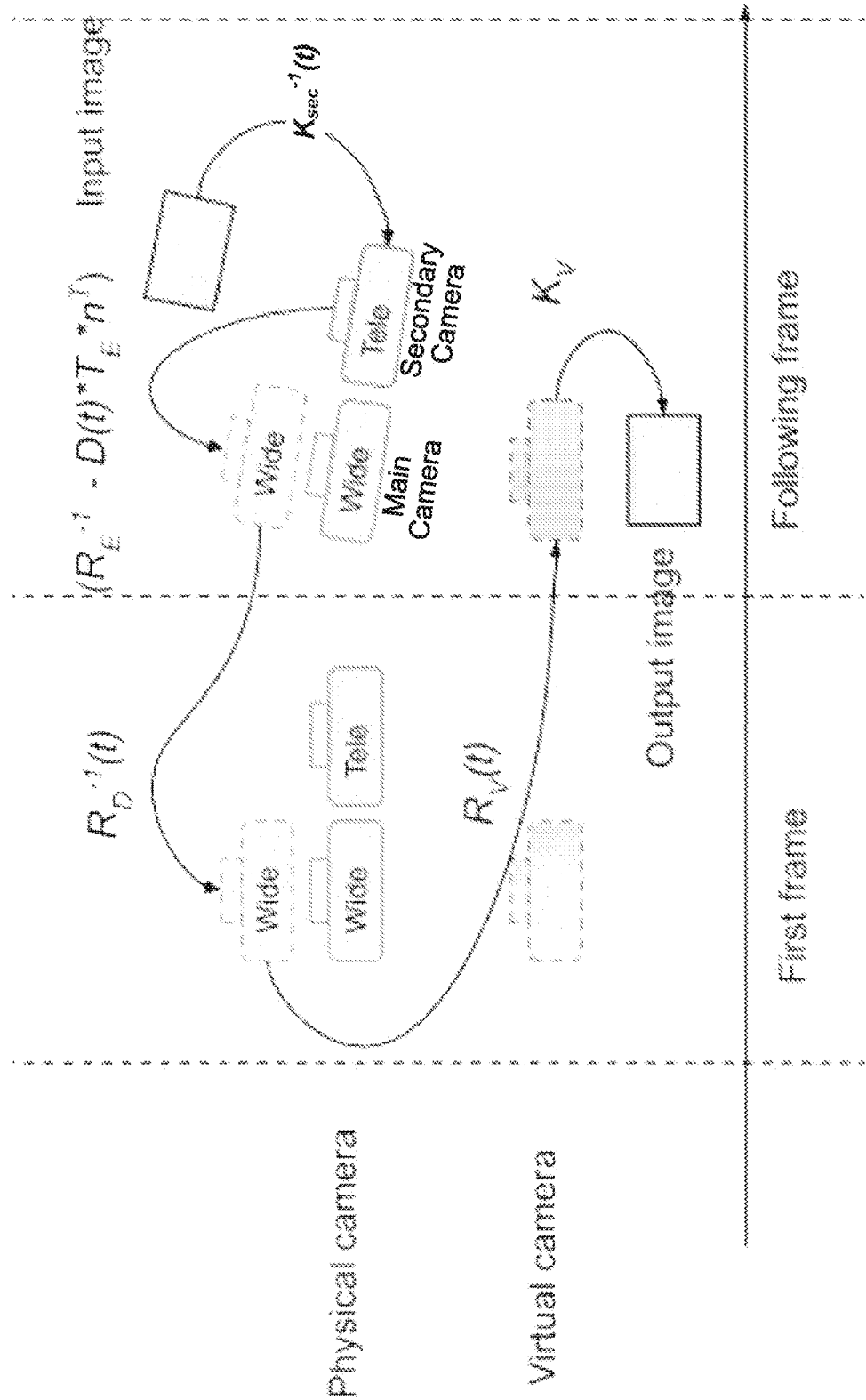

FIGS. 5A-5C are diagrams illustrating examples of techniques for multi-camera video stabilization. In the examples discussed below, one of the cameras 110*a*, 110*b* is designated as the main camera, and the other is designated as the secondary camera. Through the processing and transforms discussed below, the output of the secondary camera is mapped to the canonical space of the main camera when the recorded video is captured using the secondary camera. For clarity in description, the first camera 110*a* is used as the main camera and the second camera 110*b* is used as the secondary camera. That means that in these examples, the camera having the wider field of view is designated as the main camera. While this is desirable in some implementations, it is not required. The techniques may alternatively be used with the camera having the narrower field of view as the main camera.

In general, a homography transform is a transformation used to change from one camera space to another camera space. The notation AHB represent a homograph that transforms points from camera space B to camera space A. A virtual camera refer to a synthetic camera view, such as the virtual camera that the final scene (passed to the user and/or recorded in a video file) will be generated from. This effective camera position will be stabilized (e.g., appear as stationary as possible, in position and orientation), typically for the duration of the entire video, to provide as much temporal and spatial continuity as possible. As used herein, the "main" camera is the primary camera used to define the reference frame for generating output video. The main camera can be defined to be spatially co-located with the virtual camera, but may not be temporally co-located. In most examples below the first camera 110*a* is used as the main camera. The secondary camera is paired with the main camera. The secondary camera is defined to be spatially away from the virtual camera, and output of the secondary camera will be warped to the virtual camera space if the secondary camera is the leading camera. In most examples below the second camera 110*b* is used as the secondary camera. The "leading camera" refers to the camera that is currently open for video capture, e.g., the camera for which current image data is being used to generate the saved output video. The "follower camera" is paired with the leading camera. The follower camera is currently not open or active for video capture. Nevertheless, there can be a start-up period where the follower camera begins to capture video in anticipation of acquiring status as the leading camera, in advance of the camera's output actually being used in or saved in the output camera. A canonical camera is a conceptual camera that has fixed intrinsic parameters that will not change over time, e.g., the canonical camera is not affected by the operation of OIS or voice coil motor (VCM) lens shifts (such as for focusing). There is a canonical camera (and corresponding image space) for each of the cameras, e.g., a canonical main camera space and a canonical secondary camera space.

These parameters lead to two different use cases, depending on which of the cameras 110a, 110b is being used for capture. If the main camera is leading, no spatial warping is needed to map image data between spaces of physical cameras. The synthetic zoom and EIS processing can be performed simply with EIS processing for the main camera. On the other hand, if the secondary camera is leading, the system will apply spatial warping to map output to the perspective of the main camera, for consistency across switches between capture with the two cameras 110a, 110b. This will consider changes in focus in the scene that changes focus distance or object distance, to again preserve consistency between the outputs of the two cameras 110a, 110b.

One of the challenges of providing digital zoom while recording is the efficient incorporation of EIS processing with the digital zoom functionality, especially for the type of incremental or continuous zoom that uses multiple cameras as discussed above. During video capture, the device 102 can record video with EIS processing enabled to obtain a series of temporally stabilized image sequences. The device 102 can concatenate homographies for the zoom functionality and the EIS functionality to achieve this effect.

The homography for EIS and the homography for digital zoom using multiple cameras serve different purposes. The homography for EIS transforms image data from the current (e.g., real) output frame of an image sensor (denoted by subscript "R" or "real") to the virtual frame (denoted by subscript "V" or "virt"). In the various equations and expressions below, the variable t (e.g., lower case t) is the timestamp of the frame, which is usually related to the time of capture of the center scanline of the frame. Because different scanlines are captured at different times, however, the timestamps for the other scanlines can vary. When referring to a time of an individual scanline (e.g., to consider a time that may be different from the main time of capture for the center scanline of the frame frame), the time is denoted with $t_L$, which represents the time of capture timestamp for the scanline L. When using a camera with a rolling shutter, the timestamp for each scanline of the frame is slightly different, therefore the term $t_L$ can be slightly different for different scanlines, and also the camera positions may be slightly different for different scanlines Note that the different term $T_E$ refers to extrinsic translation between the main and secondary cameras 110a, 110b and does not represent any timestamp. Similarly, $n^T$ is a plane norm, discussed below, which is unrelated to the extrinsic translation and time terms.

The EIS homography is denoted as $^V H_R$ or $H_{eis}$. The homography from EIS is configured to transform data from the current or "real" frame to the virtual frame, by un-projecting the points from current or real frame to 3D space, then project it back to the virtual space. This homography can be represented as follows:

$$H_{eis} = Proj_{virt} * Proj_{cur}^{-1} = K_V * R_V(t) * R_C^{-1}(t) * K_C^{-1}(t) \quad \text{(Equation 1)}$$

In Equation 1, $R_V$ represents a 3×3 rotation matrix for the virtual camera, and $R_C$ represents a 3×3 rotation matrix for the real camera 110a-110b currently used, and both $R_C$ and $R_V$ can be obtained from camera position data (e.g., gyroscope data). K is the intrinsic matrix, $K_V$ is the intrinsic matrix of the virtual camera, and $K_C$ is the intrinsic matrix of the current camera (e.g., whichever of cameras 110a-110b is being used). Camera intrinsic data (e.g., based on camera geometry, calibration data, and camera properties) can be stored in and retrieved from the one or more data storage devices 230. The intrinsic matrix can be represented as follows in Equation 2.

$$K(t) = \begin{bmatrix} f(t) & 0 & o_x \\ 0 & f(t) & o_y \\ 0 & 0 & 1 \end{bmatrix} \quad \text{(Equation 2)}$$

In Equation 2, f is the focal length and $o_x$ and $o_y$ are the principal points. In the above equations, $R_C$, $R_V$ and $K_C^{-1}$ are time-dependent, shown as a function of time t. These values can retain or be based on information for previous frames or previous output frame generation processes to guarantee the temporal continuity. $R_V$ is a 3×3 rotation matrix for the virtual space and is computed based on the filter of the trajectory of the past virtual camera frames, and potentially also for some future frames if a delay and "look ahead" strategy is used. $R_C$ a 3×3 rotation matrix for the current frame, and is is computed based on data from the gyroscope or device position sensor 220, that transforms the current frame to the first frame. $K_C^{-1}$ is computed based on the optical principal center and the current OIS value.

The homography for zoom processing transforms from the view of one camera 110a to the view of another camera 110b. For example, the homography transforms from the current frame of the main camera 110a to a frame of the secondary camera 110b, denoted as $^{main}H_{sec}$. This homography may be computed using a four-point approach to compute this homography, but by simplifying the homography as a Euclidean homography, the matrix itself can also be decomposed as follows:

$$s * P_{main} = ^{main}H_{sec} * P_{sec} \quad \text{(Equation 3)}$$

Assuming an Euclidean homography transformation that brings point $P_{sec}$ on the secondary camera (e.g., telephoto camera 110b) image to the corresponding point $P_{main}$ on the main camera (e.g., wide-angle camera 110a) image, up to an arbitrary scalar of S, then this homography matrix can be decomposed as:

$$^{main}H_{sec} = K_{main}(t) * Ext(t) * K_{sec}^{-1}(t) \quad \text{(Equation 4)}$$

In this equation, Ext(t) is the extrinsic transformation, which is a matrix depending on the depth of the plane:

$$Ext(t) = (R_E^{-1} - D(t) * T_E * n^T) \quad \text{(Equation 5)}$$

As a result, the combination is shown as follows:

$$^{main}H_{sec} = K_{main}(t) * (R_E^{-1} - D(t) * T_E * n^T) * K_{sec}^{-1}(t) \quad \text{(Equation 6)}$$

In Equation 4, $n^T$ is the plane norm (e.g., vector perpendicular to the plane of focus), and D is the depth or distance at which the plane of focus is located. Variables $R_E$ and $T_E$ respectively denote the extrinsic rotation and extrinsic translation between the main and secondary cameras 110a-110b.

Variables $K_{main}$ and $K_{sec}$ are the intrinsic matrices of the main and secondary cameras 110a-110b, which have the same format as in the EIS homography discussed above. In Equation 4, $K_{main}$, $K_{sec}$, and D are time-dependent. However, unlike the corresponding versions in the EIS formulation $K_{main}$, $K_{sec}$, and D do not retain past information in the zoom formulation. $K_{main}$ and $K_{sec}$ are both computed based on the current VCM and OIS values (e.g., using OIS position data 248a-248b), which change for each frame. The variable D corresponds to the object distance, which is related to the focus distance value during auto-focusing, and which may change over time during video capture and recording. As discussed above, the object distance refers to the distance of the focal plane from the device 102 for the current focus selected for a camera. The object distance can be determined using the focus position of a camera, e.g., from focus position data 246a-246b, and calibration data such as a look-up table that indicates the correspondence of focus settings or focus element positions to object distances indicating how far focused-on objects are from the camera sensor plane. Given the offset in position between the cameras 110a, 110b, the relationship between the captured images can vary somewhat depending on object distance, and the transforms can take into account these effects using the object distance, lens focus position, and/or other data.

The two homography decompositions above can be summarized as a sequence of operations: (1) un-projecting from the source camera, (2) transforming from the source camera to world three-dimensional reference frame, (3) transforming from world to target three-dimensional reference frame, (4) re-projecting back to the target camera. These are summarized in Table 1 below, and also discussed with respect to FIGS. 5A-5C and FIG. 6.

TABLE 1

| Homo-graphy | Un-projection | Transformation from source to world | Transformation from world to target | Re-projection |
|---|---|---|---|---|
| EIS | $K_C^{-1}(t)$ As the current camera, either main or secondary | $R_C^{-1}(t)$ Accumulated rotation from Gyroscope data | $R_V(t)$ The filtered virtual camera | $K_V$ Virtual camera with fixed parameters |
| Zoom | $K_{sec}^{-1}(t)$ The current secondary camera | $(R_E^{-1} - D(t)*T_E*n^T)$ Extrinsic between the secondary and world | Identity as the primary camera resides on world | $K_{main}(t)$ The current main camera |

The next section describes techniques for combining the zoom homography and EIS homography in an effective and computationally efficient manner One of the techniques that can be used is to set one camera, typically the camera with the widest field of view, as the main camera and mapping processed output with respect to the main camera.

When the main camera (e.g., the wide camera 110a) is used for video capture, the term $^{main}H_{sec}$ is identity. As a result, the combined homography can be simply the EIS homography $H_{eis}$, as shown in equation 7.

$$H_{combined} = H_{eis} = K_V * R_V(t) * R_D^{-1}(t) * K_{main}^{-1}(t) \quad \text{(Equation 7)}$$

The term $R_D$ indicates the device rotation, computed based on data from a gyroscope or other movement sensor, which has the same value for both the main camera 110a and the secondary camera 110b.

Specifically, the three homography transforms are:

$^{sec\_can}H_{sec}$: transformation from real secondary camera to canonical secondary camera space which is with (0, 0) OIS motion, 0 rolling shutter time, fixed focal length and rotation at frame center.

$$^{sec\_can}H_{sec} = K_{sec\_can} * R_{sec\_can}(t) * R_{sec}^{-1}(t) * K_{sec}^{-1}(t)$$

where $R_{sec}^{-1}(t) * K_{sec}^{-1}(t)$ is obtained from each scanline or frame center depending on what is needed, which will corp with the given OIS/VCM values.

$R_{sec\_can}(t)$ is the rotation at frame center, contrary to $R_{sec}^{-1}(t)$ at each scanline.

$^{main\_can}H_{sec\_can}$: transformation from canonical secondary camera to the canonical main camera space.

$$^{main\_can}H_{sec\_can} = K_{main\_can} * Ext(t) * K_{sec\_can}^{-1}$$

In this expression, Ext(t) is an extrinsic transformation, which is a matrix depending on the object distance (e.g., depth in space of the plane of focus from the camera sensor):

$$Ext(t) = (R_E^{-1} - D(t)*T_E*n^T)$$

where $n^T$ is the plane norm, D is the depth of the plane $n^T$, $R_E$ and $T_E$ are the extrinsic rotation and translation between secondary and main cameras.

$^{virt}H_{main\_can}$: transformation from canonical secondary camera to the stabilized virtual camera space, which rotation is filtered by the EIS algorithm.

$$^{virt}H_{main\_can} = K_{virt} * R_{eis} * (K_{main\_can} * R_{main\_can})^{-1}$$

Note that $R_{main\_can} = R_{sec\_can}$ is the current real camera rotation at the frame center, because the main and secondary cameras are rigidly attached to each other.

If the three homographies are concatenated together, the final homography is obtained:

$$H_{final} = {}^{virt}H_{main\_can} * {}^{main\_can}H_{sec\_can} * {}^{sec\_can}H_{sec}$$

$$H_{final} = K_{virt} * R_{eis}(t) * (K_{main\_can} * R_{main\_can}(t))^{-1} * {}^{main\_can}$$

$$H_{sec\_can} * K_{sec\_can} * R_{sec\_can}(t) * R_{sec}^{-1}(t) * K_{sec}^{-1}(t)$$

Where the middle term $^{main\_can}H_{sec\_can}$ comes from the zoom processing.

For the case when the Main camera is leading, the final homography simplifies to just the homography for the EIS processing. The above equation becomes:

$$H_{final} = {}^{virt}H_{main\_can} * {}^{main\_can}H_{main\_can} * {}^{main\_can}H_{main}$$

$$H_{final} = {}^{virt}H_{main\_can} * {}^{main\_can}H_{main}$$

Which is to set $^{main\_can}H_{sec\_can}$=identity, the above equation becomes the original $H_{eis}$ equation:

$$H_{final}=K_{virt}*R_{eis}(t)*(K_{main\_can}*R_{main\_can}(t))^{-1}*\text{Identity}*K_{main\_can}*R_{main\_can}(t)*R_{main}^{-1}(t)*K_{main}^{-1}(t)$$

$$H_{final}=K_{virt}*R_{eis}(t)*R_{main}^{-1}(t)*K_{main}^{-1}(t)$$

$$H_{final}=K_{virt}*R_{eis}(t)*R_{main}^{-1}(t)*K_{main}^{-1}(t)$$

$$H_{final}=H_{eis}$$

From above sections, we generally will have two equations:

When secondary camera is leading, the equation is:

$$^{virt}H_{sec}={}^{virt}H_{main\_can}*{}^{main\_can}H_{sec\_can}*{}^{sec\_can}H_{sec}$$

When main camera is leading, the equation is:

$$^{virt}H_{main}={}^{virt}H_{main\_can}*{}^{main\_can}H_{main}=H_{eis}$$

From the engineering point of view, during the implementation of EIS, there is no secondary camera, therefore, all the virtual cameras are located on the current leading camera, which means, for the original EIS pipeline:

When the main camera is leading:

$$H_{eis}=\text{Proj}_{virt\_main}*\text{Proj}_{main}^{-1}$$

When the secondary camera is leading:

$$H_{eis}=\text{Proj}_{virt\_sec}*\text{Proj}_{sec}^{-1}$$

From the base equation of EIS where,
$\text{Proj}_{cur}^{-1}=R_C^{-1}(t)*K_C^{-1}(t)$—The unprojection on the current real camera view
$\text{Proj}_{virt}=K_V*R_V(t)$—The projection onto the current virtual camera.

The term $K_V$ is always defined the same as the current camera, and by definition, the only difference between $K_{v\_main}$ and $K_{v\_sec}$ is the FOV between the two cameras, (principal points are the same, since the virtual camera is placed at the center of the image).

In order to adapt for the above case, the system can intentionally assure the field of view in the main camera and secondary camera match each other at the switching point. This field of view match is efficiently done through hardware cropping, ahead of all the operations, which is to scale the field of view from the secondary camera to the main camera, the matrix S is used in the following equations.

$$S = \begin{pmatrix} f_{sec}/f_{main} & 0 & 0 \\ 0 & 0 & f_{sec}/f_{main} \\ 0 & 0 & 1 \end{pmatrix}$$

From the software side, the equation for the homography adapts to:

$$H_{final} = K_{virt\_sec} * R_{eis}(t) * (K_{sec\_can} * R_{sec\_can}(t))^{-1} *$$
$$S *{}^{main\_can}H_{sec\_can} * K_{sec\_can} * R_{sec\_can}(t) * R_{sec}^{-1}(t) * K_{sec}^{-1}(t)$$

The final applied homography can be:

$$^{main\_can}H'_{sec\_can} = S *{}^{main\_can}H_{sec\_can} = {}^{sec\_can\prime}H_{sec\_can}$$

That transformation maps from the canonical secondary space to a normalized canonical secondary space that has the same field of view (e.g., scale) as the canonical secondary, but which has neutralized all the translations/rotation caused by the camera extrinsic factors.

When the camera considered the secondary camera (e.g., telephoto camera 110b), is used for video capture, there are a series of transformations used to convert or project the view from the secondary camera onto the view from the primary camera, to allow consistent image characteristics to be maintained across periods of capture using the different cameras 110a, 110b. These transformations can include (1) unprojecting from source camera (e.g., second camera 110b) to remove camera-specific effects like OIS motion and rolling shutter; (2) transforming to a canonical reference frame, such as a three-dimensional world; (3) transforming from the canonical reference frame to the main camera reference (e.g., aligning to the frame that would be captured by the first camera 110a), and (4) re-projecting from the frame of the main camera 110a to a virtual camera frame that has electronic stabilization applied. Based on the order of the transformations, the technique could be performed with rectification first or stabilization first, which result in different performance results. FIGS. 5A-5C show different techniques for transforming captured images from the second camera 110b to a stabilized view that is aligned with and consistent with the stabilized view generated for the first camera 110a.

FIG. 5A is a diagram illustrating an example technique for multi-camera video stabilization that performs rectification first. This technique rectifies the view from the second camera 110b (e.g., telephoto camera in this example) to the first camera 110a (e.g., wide-angle camera in this example) first, and then applies the stabilization. This technique provides the advantage of being represented by a simple concatenation of the EIS homography and the primary secondary-to-main homography, which increases the efficiency of processing the video feed. This is shown in the following equation:

$$H_{combined}=K_V*R_V(t)*R_D^{-1}(t)*(R_E^{-1}-D(t)*T_E*n^T)*K_{sec}^{-1}(t)$$

By attaching $K_{main}^{-1}(t)K_{main}(t)$ pair, this results in:

$$H_{combined}=K_V*R_V(t)*R_D^{-1}(t)*K_{main}^{-1}(t)*K_{main}(t)*(R_E^{-1}-D(t)*T_E*n^T)*K_{sec}^{-1}(t)$$

$$H_{combined}=(K_V*R_V(t)*R_D^{-1}(t)*K_{main}^{-1}(t))*(K_{main}(t)*(R_E^{-1}-D(t)*T_E*n^T)*K_{sec}^{-1}(t))$$

$$H_{combined}=H_{eis}*{}^{main}H_{sec}$$

FIG. 5B is a diagram illustrating an example technique for multi-camera video stabilization that performs stabilization first. This option stabilizes the image from the secondary camera frame to a stabilized virtual main camera frame, then applies the rectification to project the virtual secondary camera frame to the main camera frame. This technique is not as straightforward as the approach of FIG. 5A, however, because the transformation from secondary camera to the main camera is defined in the main camera frame coordinate system. Therefore, in order to perform the same transformation, the stabilized virtual main camera frame has to be rotated back from the virtual secondary frame. This is expressed in the equation below, where "virt_main" refers to the main camera's virtual frame (stabilized), "virt_sec" refers to the secondary camera's virtual frame (stabilized), "real_main" refers to the main camera's real frame (not stabilized), and "real_sec" refers to the secondary camera's real frame.

$$^{virt\_main}H_{virt\_sec} = {}^{virt\_sec}H_{real\_sec} * {}^{real\_main}H_{real\_sec} * {}^{real\_sec}H_{virt\_sec}$$

$$^{virt\_main}H_{virt\_sec} = R_V(t) * R_D^{-1}(t) * (R_E^{-1} - D(t) * T_E * n^T) * R_D^{-1}(t) * R_V(t))$$

By concatenating the items, the result is the same overall transformation as in FIG. 5A. Even though there is a different geometric definition, the overall effect on the image is the same.

$$H_{combined} = K_V * R_V(t) * R_D^{-1}(t) * (R_E^{-1} - D(t) * T_E * n^T) * R_D^{-1}(t) * R_V(t)) * R_V(t) * R_D^{-1}(t) * K_{sec}^{-1}(t)$$

$$H_{combined} = K_V * R_V(t) * R_D^{-1}(t) * K_{main}^{-1}(t) * K_{main}(t) * (R_E^{-1} - D(t) * T_E * n^T) * K_{sec}^{-1}(t)$$

$$H_{combined} = (K_V * R_V(t) * R_D^{-1}(t) * K_{main}^{-1}(t)) * (K_{main}(t) * (R_E^{-1} - D(t) * T_E * n^T) * K_{sec}^{-1}(t))$$

$$H_{combined} = H_{eis} * {}^{main}H_{sec}$$

FIG. 5C is a diagram illustrating an example technique for multi-camera video stabilization that rectifies to a canonical camera first. Using the geometry definitions discussed above, the implementation can be made more efficient by rectifying from current real camera view to a canonical camera view, where the canonical camera view is defined as a virtual camera of the current leading camera but with fixed OIS (OIS_X=0, OIS_Y=0) and fixed VCM (VCM=300).

The result is similar to the equation in the first case of FIG. 5A. For example, this provides:

$$H_{combined} = K_V * R_V(t) * R_D^{-1}(t) * (R_E^{-1} - D(t) * T_E * n^T) * K_{sec}^{-1}(t)$$

In this case, however, instead of inserting $K_{main}^{-1}(t) K_{main}(t)$ pair, we will insert $K_{main\_can}^{-1}(t) * K_{main\_can}(t)$, where $K_{main\_can}$ denotes the canonical main camera's intrinsic characteristics. The terms $H'_{eis}$ and $^{main}H'_{sec}$ are computed using $K_{main\_can}$.

$$H_{combined} = (K_V * R_V(t) * R_D^{-1}(t) * K_{main\_can}^{-1}(t)) *$$
$$(K_{main\_can}(t) * (R_E^{-1} - D(t) * T_E * n^T) * K_{sec}^{-1}(t))$$

$$H_{combined} = H'_{eis} * {}^{main}H'_{sec}$$

This approach provides a significant advantage, because the system does not need to query for metadata of both the secondary and main cameras simultaneously.

The combined homography, $H_{combined}$, can be used with canonical position representations and per-scanline handling. First, the canonical position will be discussed. From the original definition of $H_{eis}$ and $^{main}H_{sec}$ discussed, the system uses OIS and VCM information for both the $K_{sec}$ & $K_{main}$ terms that were used in the homography for digital zoom processing. The system also uses the term $K_C$ that was used in EIS homography.

In the following equation, certain variables are time-dependent variables that depend on the current OIS and VCM values, for main and secondary cameras respectively. These time-dependent variables include $K_{main}^{-1}(t)$, $K_{main}(t)$, and $K_{sec}^{-1}(t)$. The time-dependence of these terms means that the system would need to stream both the OIS/VCM metadata for both cameras 110a, 110b simultaneously. However, using a canonical representation can reduce the data gathering requirements greatly. An example representation is shown below, including terms $K_{sec}^C$ and $K_{main}^C$ are defined as the canonical camera model with both OIS and VCM placed at a predetermined standard or canonical position, for example, where the canonical position is a predefined position with $OIS_X=OIS_Y=0$, and VCM=300. For the original $H_{combined}=H_{eis}*{}^{main}H_{sec}$, the representation can be decomposed as:

$$H_{combined}=(K_V*R_V(t)*R_D^{-1}(t)*K_{main}^{C-1})*(K_{main}^{C}*$$
$$(R_E^{-1}-D(t)*T_E*n^T)*K_{sec}^{C-1})*C_{sec}(t))$$

In the equation above, the term $C_{sec}(t)$ is a correction matrix that transforms the current camera view to the canonical camera view (e.g., removing the effects of OIS lens position). Because the digital zoom homography is only active when capturing video from the second camera 110b (e.g., the telephoto camera), only one correction matrix term $C_{sec}(t)$ is needed, one that transforms the current secondary camera view to a canonical secondary camera view. In this new equation, $K_{main}^C$ and $K_{sec}^C$ are both constant over time for the homography for digital zoom:

$$^{main}H_{sec} = K_{main}^C * (R_E^{-1} - D(t) * T_E * n^T) * K_{sec}^{C-1}$$

As a result, the only time-dependent component is D(t), which depends on the object distance for focus, which can be a distance from the camera to the plane of focus. Thus, the only new metadata needed would be the object distance.

The corrections for each scanline will now be discussed. The per-scanline correction can include the use of another matrix, $S(t_L, L)$, to the right of the equations discussed above. This additional matrix can be used to make scanline-specific corrections, with a different adjustment potentially indicated for each scanline L. The per-scanline correction matrix, $S(t_L, L)$, depends on the current time $t_L$ of a scanline (e.g., to obtain gyroscope sensor data for the appropriate time the scanline was captured) and the scanline number L (e.g., used to correct for deformation or shift to bring each scanline into alignment with the center scanline) As a result, the matrix $S(t_L, L)$ can include the corrections for each scanline L and its corresponding time of capture $t_L$.

From the original decomposed equation the addition of the per-scanline correction matrix provides:

$$H_{combined} = (K_V * R_V(t) * R_D^{-1}(t) * K_{main}^{C-1}) *$$
$$(K_{main}^C * (R_E^{-1} - D(t) * T_E * n^T) * K_{sec}^{C-1}) * C_{sec}(t) * S(t_L, L)$$

A final homography can be determined by adding the canonical position and the per-scanline terms:

$$H_{combined} = \left(K_V * R_V(t) * R_D^{-1}(t) * K_{main}^{C-1}\right) *$$
$$\left(K_{main}^C * \left(R_E^{-1} D(t) * T_E * n^T\right) * K_{sec}^{C-1}\right) * C_{sec}(t) * S(t_L, L)$$
$$H_{combined} = H_{eis}^C * {}^{main}H_{sec}^C * C_{sec}(t) * S(t_L, L)$$

In this example, $H^C_{eis} = K_V * R_V(t) * R_D^{-1}(t) * K_{main}^{C-1}$ represents the stabilization matrix on a canonical main camera only. In addition, the term $^{main}H^C_{sec} = K_{main}^C * (R_E^{-1} - D(t) * T_E * n^T) * K_{sec}^{C-1}$ represents the homography from canonical secondary view to canonical main view. The term $C_{sec}(t)$ is the homography that brings the current secondary camera view to the canonical secondary camera view. The term $S(t_L, L)$ is the per-scanline correction that brings each scanline's deformation to the reference position of the center line.

Figure 6:
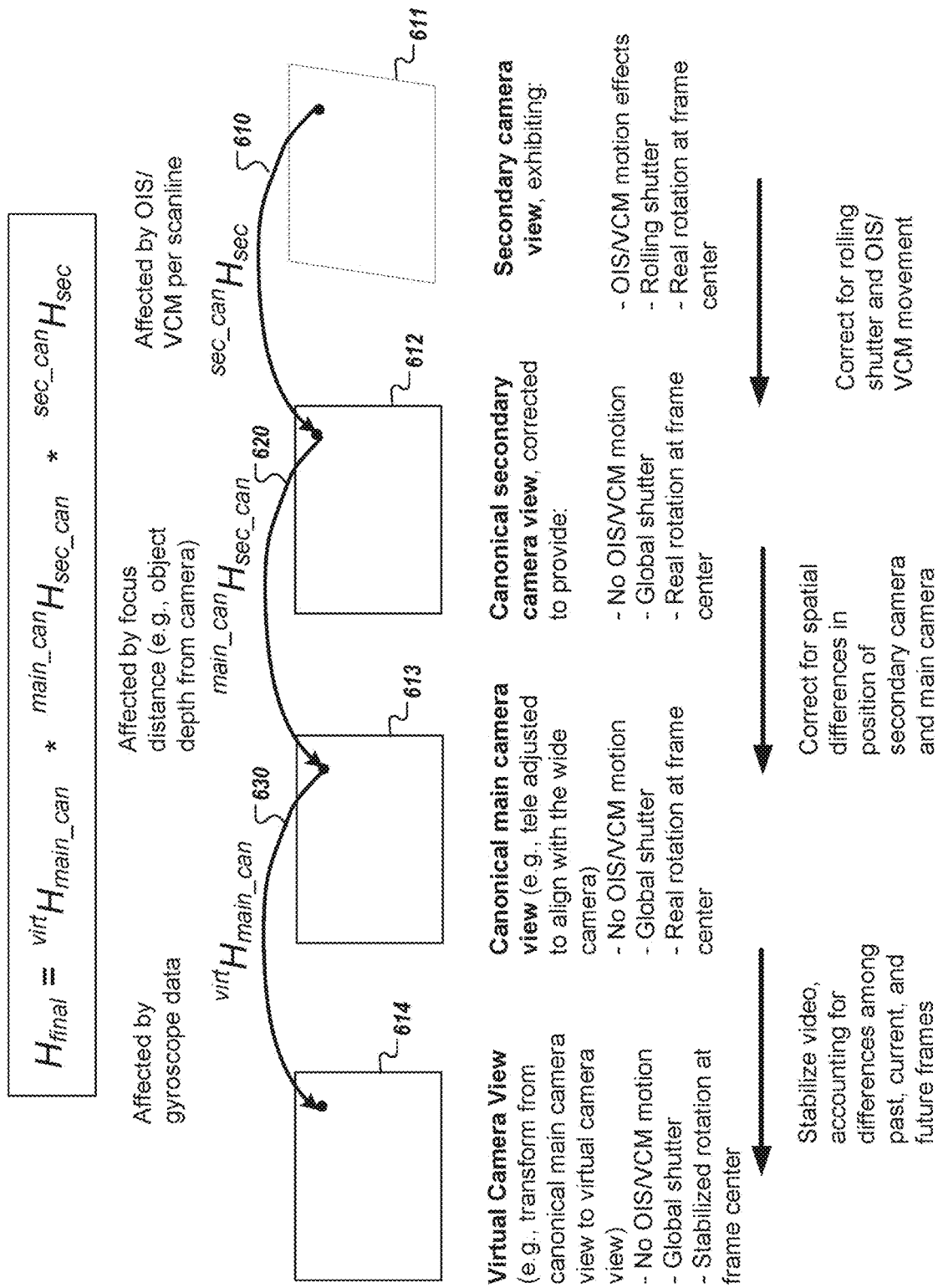
FIG. 6 is a diagram showing example transformations that can be used to efficiently provide multi-camera video stabilization.

FIG. 6 is a diagram showing example transformations that can be used to efficiently provide multi-camera video stabilization. The combination of EIS and continuous zoom can be interpreted as a combination of three homographies or transformations.

In the example, an image frame 611 represents the image frame as captured by the second camera 110b. Through the multiple transformations represented in the figure, the image data is processed to remove visual artifacts (e.g., rolling shutter, OIS motion, etc.), aligned with the field of view of the first camera 110a, and stabilized using EIS techniques discussed above. The separate transformations 610, 620, 630 are shown for purposes of illustration, as are the various images 611-614. Implementations may combine the operations and functions discussed without needing to separately generate the intermediate images.

The first transformation 610 operates on a captured image 611 from the real secondary camera 110b (e.g., telephoto camera) and transforms the image 611 to canonical second camera image 612. The transformation 610 adjusts the image data for the image 611 so that the canonical second camera image 612 includes no OIS motion, no rolling shutter, a fixed focal length, and with rotation at the frame center. In some implementations, the first transformation 610 may adjust each image scanline of the image 611 individually to remove or reduce the effects of movement of the second camera 110b over the course of capture of the image 611, change in focus distance over the course of capture of the image 611, movement of the OIS system during capture of the image 611 and so on. This transformation 610 is represented as $^{sec\_can}H_{sec}$, or a transformation from the second camera view ("sec") to the canonical second camera view ("sec_can"). Although OIS stabilization may be used during capture of the image 611, neither the image 611 nor the image 612 has been stabilized using EIS processing.

The second transformation 620 is a transformation from the canonical second camera image 612 to a canonical first camera image 613. This can maintain the image data in the same canonical space of the image 612 but align the image data to the scene captured by the main camera, e.g., the first (e.g., wide) camera 110a. This transformation 620 can correct for spatial differences between the second camera 110b and the first camera 110a. The two cameras 110a, 110b are located on a phone or other device with a spatial offset between them and potentially other differences in position or orientation. The second transformation 612 can correct for these differences to project the image 612 onto the corresponding portion of the field of view of the first camera 110a. In addition, the differences between the views of the cameras 110a, 110b can vary depending on the current focus depth. For example, one or both of the cameras 110a, 110b may experience focus breathing that adjusts the effective field of view depending on the focus distance. The second transformation 620 can take these differences into account, allowing the device 102 to use the focus distance to fine-tune the alignment of the image 612 with respect to the main camera canonical field of view. Typically, the same canonical parameters for OIS position, etc. are used for both the main camera and secondary camera canonical representations, but if there are differences, these can be corrected for using the second transformation 620.

The third transformation 620 applies EIS to the image 613 to produce a stabilized image 614. For example, this transformation 620 can transform image data from the canonical main camera view to a virtual camera view in which camera positions are smoothed or filtered. For example, this transformation 630 can be the second projection discussed above with respect to FIG. 3, wherein virtual camera positions are filtered over time, changes in position between frames is used, movement is potentially allowed due to blur, likelihood of panning vs. accidental movement is taken into account, accommodations for future motion or adjustment to fill the output frame are performed, and so on. The EIS processing can be performed using the current frame being processed, as well as a window of previous frames and a window of future frames. Naturally, the EIS processing can lag behind the image capture timing to collect the "future frames" needed for processing.

As noted above, the transformations 610, 620, 630 can be combined or integrated for efficiency, and the intermediate images 612 and 613 need not be generated. Rather, the device 102 may determine the appropriate transformations 610, 620, 630 and directly generate a stabilized image 614 that is aligned to and consistent with the stabilized image data generated from images captured using the first camera 110a.

The example of FIG. 6 shows the transformations from video frames from the second camera 110b to the stabilized space of the first camera 110a, which is used when the zoom level corresponds to a field of view that is the same as or smaller than the field of view of the second camera 110b. When the first camera 110a is used, e.g., when the field of view is larger than that of the second camera 110b, only two transformations are needed. Similar to the first transformation 610, a transformation is applied to remove time-dependent effects from a captured image, such as conditions that change for different scanlines of a video frame. As with the transformation 610, this compensates for rolling shutter, OIS positions, and so on. However, the transformation projects image data directly to the canonical camera space for the main camera (e.g., camera 110a). From the canonical camera space for the main camera, only the EIS transformation is needed, e.g., the transformation 630. Thus, when image data is captured using the main camera, there is no need to relate the spatial properties of the two cameras 110a, 110b, because the overall image capture and EIS processing is done consistently in a reference frame for the main camera, e.g., from the canonical, non-time-dependent reference frame for the main camera.

The processing of FIG. 6 shows various processes that can be used to transform or map output of the second camera 110b to the stabilized output of the first camera 110a. This provides consistency in the view when transitioning, during video capture and recording, between using video captured by the different cameras 110a, 110b. For example, the video from the second camera 110b is aligned with video from the first camera 110a—not just positioning the field of view in the correct position but also matching the EIS properties. As a result, switching between cameras (e.g., due to digital zoom above or below a threshold zoom level) during image capture can be done with EIS active, with the video feed matched in a way that minimizes or avoids jerkiness, sudden image shifts or shifts in view, and shifts in apparent video smoothness (e.g., changes in EIS application) at the point of transition between the cameras 110a, 110b. Another advantage of this technique is that the video from the camera 110a can be used without any adjustment or processing for consistency with the second camera 110b. Only the output of the second camera 110b is adjusted, and it is consistently aligned with respect to the view and characteristics of the first camera 110a.

The device 102 can also adjust video capture settings, during video capture, to better match the properties of video captured using the different cameras 110a, 110b. For example, when transitioning from capture using the first camera 110a to capture using the second camera 110b, the device 102 can determine properties such as the focus distance, OIS parameters (e.g., whether OIS is enabled, strength or level of OIS applied, etc.), exposure settings (e.g., ISO, sensor sensitivity, gain, frame capture time or shutter speed, etc.) and so on that are being used for the first camera 110a just before the transition. The device 102 can then cause the second camera 110b to have those settings, or settings providing a comparable result, to be used for capture for the second camera 110b.

This can involve making the settings changes in advance of the transition to include video from the second camera 110b in the recorded video. For example, to provide time to make the adjustments in operation, the device 102 may detect that a camera switch is appropriate or needed, and in response, determine the current settings for the first camera 110a and instruct the second camera 110b to begin using settings equivalent to the ones used by the first camera 110a. This can provide sufficient time to, for example, power on the second camera 110b, engage and achieve stabilization of the OIS system for the second camera 110b, adjust exposure of the second camera 110b to match that of the first camera 110a, set focus position of the second camera 110b to match that of the first camera 110a, and so on. Once the second camera 110b is operating in the appropriate mode, e.g., with video capture parameters consistent with the video capture parameters of the first camera 110a, the device 102 switches from using the first camera 110a to using the second camera 110b for video capture. In a similar manner, when transitioning from the second camera 110b to the first camera 110a, the device 102 can determine the video capture parameter values used by the second camera 110b and can set corresponding video capture parameter values for the first camera 110a before making the transition.

A number of implementations have been described. Nevertheless, it will be understood that various modifications may be made without departing from the spirit and scope of the disclosure. For example, various forms of the flows shown above may be used, with steps re-ordered, added, or removed. As another example modification, although the above description primarily describes that the processing of the image data is performed while capturing video by the first and/or second camera, it will be appreciated that in some implementations the first transformation to the second canonical reference space for the second camera, the second transformation from the second canonical reference space to the first canonical reference space for the first camera, and the third transformation to apply electronic image stabilization to image data in the first canonical reference space for the first camera may instead be applied (by the device 102 or another e.g. remote device) at a later time, e.g. when the video is no longer being captured.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

We claim:

1. A method comprising:
    capturing, using a first camera of a multi-camera video capture device with a first field of view, one or more frames of a scene in a first zoom range of a digital zoom range of the multi-camera video capture device;
    altering the zoom level from the first zoom range to a second zoom range of the digital zoom range;
    responsive to altering the zoom level to the second zoom range, capturing, using a second camera of the multi-camera video capture device with a second field of view, one or more additional frames of the scene in the second zoom range;
    generating a stabilized video that maintains temporal continuity for the scene as captured by the first and second cameras, wherein the stabilized video comprises the one or more frames of the scene and the one or more additional frames of the scene; and
    providing the stabilized video by the multi-camera video capture device.

2. The method of claim 1, wherein generating the stabilized video comprises:
    generating, based on a first transformation of the one or more additional frames of the scene in the second zoom range to a second canonical reference space for the second camera, first transformation image data;
    generating, based on a second transformation of the first transformation image data to a first canonical reference space for the first camera, second transformation image data; and
    applying, to the second transformation image data, electronic image stabilization in the first canonical reference space for the first camera to produce the stabilized video of the one or more additional frames of the scene in the second zoom range.

3. The method of claim 2, wherein applying electronic image stabilization to the second transformation image data is performed by another device different from the multi-camera video capture device.

4. The method of claim 3, wherein applying electronic image stabilization to the second transformation image data is performed by a remote server.

5. The method of claim 2, wherein applying electronic image stabilization to the second transformation image data is performed after the first camera and the second camera have completed image capture.

6. The method of claim 5, wherein applying electronic image stabilization to the second transformation image data comprises for each particular frame of the one or more additional frames using one or more frames prior to the particular frame and one or more frames after the particular frame.

7. The method of claim 2, wherein generating the stabilized video further comprises:

generating, based on a third transformation of the one or more frames of the scene in the first zoom range to a first canonical reference space for the first camera, third transformation image data; and applying, to the third image transformation image data, electronic image stabilization in the first canonical reference space for the first camera to produce the stabilized video of the one or more frames of the scene in the first zoom range.

8. The method of claim 2, wherein the second canonical reference space for the second camera and the first canonical reference space for the first camera are conceptual camera spaces defined by a predetermined, fixed set of camera intrinsic properties such that projecting image data to the canonical reference spaces removes time-dependent effects during capture of a video frame.

9. The method of claim 8, wherein:

the first camera includes an optical image stabilization (OIS) system and the first canonical reference space for the first camera is one in which image data is represented having a consistent, predetermined OIS position; or the second camera includes the OIS system and the second canonical reference space for the second camera is one in which image data is represented having a consistent, predetermined OIS position.

10. The method of claim 9, wherein:

the first camera provides image data that captures image scanlines of an image frame progressively and the first canonical reference space for the first camera is one in which image data has been corrected to remove distortion due to progressive capture for the image scanlines; or the second camera provides image data that captures image scanlines of an image frame progressively and the second canonical reference space for the second camera is one in which image data has been corrected to remove distortion due to progressive capture for the image scanlines.

11. The method of claim 1, wherein the second field of view of the second camera is included within the first field of view of the first camera or the first field of view of the first camera is included within the second field of view of the second camera.

12. One or more non-transitory computer-readable storage media comprising computer-executable instruction that, when executed by one or more processors, cause the one or more processors to:

capture, using a first camera of a multi-camera video capture device with a first field of view, one or more frames of a scene in a first zoom range of a digital zoom range of the multi-camera video capture device;

alter the zoom level from the first zoom range to a second zoom range of the digital zoom range;

responsive to altering the zoom level to the second zoom range, capture, using a second camera of the multi-camera video capture device with a second field of view, one or more additional frames of the scene in the second zoom range;

generate a stabilized video that maintains temporal continuity for the scene as captured by the first and second cameras, wherein the stabilized video comprises the one or more frames of the scene and the one or more additional frames of the scene; and provide the stabilized video by the multi-camera video capture device.

13. The one or more non-transitory computer-readable storage media of claim 12, wherein generating the stabilized video comprises:

generating, based on a first transformation of the one or more additional frames of the scene in the second zoom range to a second canonical reference space for the second camera, first transformation image data;

generating, based on a second transformation of the first transformation image data to a first canonical reference space for the first camera, second transformation image data; and applying, to the second transformation image data, electronic image stabilization in the first canonical reference space for the first camera to produce the stabilized video of the one or more additional frames of the scene in the second zoom range.

14. The one or more non-transitory computer-readable storage media of claim 13, wherein applying electronic image stabilization to the second transformation image data is performed after the first camera and the second camera have completed image capture.

15. The one or more non-transitory computer-readable storage media of claim 14, wherein applying electronic image stabilization to the second transformation image data comprises for each particular frame of the one or more additional frames using one or more frames prior to the particular frame and one or more frames after the particular frame.

16. The one or more non-transitory computer-readable storage media of claim 13, wherein generating the stabilized video further comprises:

generating, based on a third transformation of the one or more frames of the scene in the first zoom range to a first canonical reference space for the first camera, third transformation image data; and applying, to the third image transformation image data, electronic image stabilization in the first canonical reference space for the first camera to produce the stabilized video of the one or more frames of the scene in the first zoom range.

17. The one or more non-transitory computer-readable storage media of claim 13, wherein the second canonical reference space for the second camera and the first canonical reference space for the first camera are conceptual camera spaces defined by a predetermined, fixed set of camera intrinsic properties such that projecting image data to the canonical reference spaces removes time-dependent effects during capture of a video frame.

18. The one or more non-transitory computer-readable storage media of claim 17, wherein:

the first camera includes an optical image stabilization (OIS) system and the first canonical reference space for the first camera is one in which image data is represented having a consistent, predetermined OIS position; or the second camera includes the OIS system and the second canonical reference space for the second camera is one in which image data is represented having a consistent, predetermined OIS position.

19. A video capture device comprising:

a first camera having a first field of view;
a second camera having a second field of view;
one or more position or orientation sensors;
one or more processors; and
one or more computer readable storage media comprising computer-readable instructions that, when executed by the one or more processors, are configured to:

capture, using a first camera of a multi-camera video capture device with a first field of view, one or more frames of a scene in a first zoom range of a digital zoom range of the multi-camera video capture device;

alter the zoom level from the first zoom range to a second zoom range of the digital zoom range;

responsive to altering the zoom level to the second zoom range, capture, using a second camera of the multi-camera video capture device with a second field of view, one or more additional frames of the scene in the second zoom range;

generate a stabilized video that maintains temporal continuity for the scene as captured by the first and second cameras, wherein the stabilized video comprises the one or more frames of the scene and the one or more additional frames of the scene; and provide the stabilized video by the multi-camera video capture device.

20. The video capture device of claim 19, wherein generating the stabilized video comprises:

generating, based on a first transformation of the one or more additional frames of the scene in the second zoom range to a second canonical reference space for the second camera, first transformation image data;

generating, based on a second transformation of the first transformation image data to a first canonical reference space for the first camera, second transformation image data; and applying, to the second transformation image data, electronic image stabilization in the first canonical reference space for the first camera to produce the stabilized video of the one or more additional frames of the scene in the second zoom range.

* * * * *